US012267142B2

(12) United States Patent
King et al.

(10) Patent No.: US 12,267,142 B2
(45) Date of Patent: *Apr. 1, 2025

(54) FORMING A BEAM FROM A SUBSCRIBER MODULE OF A FIXED WIRELESS ACCESS COMMUNICATION SYSTEM

(71) Applicant: Cambium Networks Ltd, Ashburton (GB)

(72) Inventors: Nigel Jonathan Richard King, Ashburton (GB); Thirumaran Muthiah, Ashburton (GB); Matt Fuller, Ashburton (GB)

(73) Assignee: Cambium Networks Ltd, Ashburton (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/310,313

(22) Filed: May 1, 2023

(65) Prior Publication Data

US 2023/0268978 A1 Aug. 24, 2023

Related U.S. Application Data

(63) Continuation of application No. 17/547,022, filed on Dec. 9, 2021, now Pat. No. 11,677,456.

(30) Foreign Application Priority Data

Dec. 11, 2020 (GB) ..................... 2019618

(51) Int. Cl.
H04B 7/08 (2006.01)
H01Q 3/20 (2006.01)

(52) U.S. Cl.
CPC .............. *H04B 7/086* (2013.01); *H01Q 3/20* (2013.01); *H04B 7/0888* (2013.01)

(58) Field of Classification Search
CPC .... H04B 7/086; H04B 7/0888; H04B 7/0617; H01Q 3/20; H01Q 19/192
See application file for complete search history.

(56) References Cited

U.S. PATENT DOCUMENTS 6,204,822 B1 3/2001 Cardiasmenos
8,335,167 B1 12/2012 Zhang
(Continued)

FOREIGN PATENT DOCUMENTS

EP 1020952 7/2000

OTHER PUBLICATIONS

Q. Lai et al, A digital beam-forming multiple-beam reflector antenna subsystem for GEO communication satellites 2016 46<sup>th</sup> European Microwave Conference (EuMC) 2016 pp. 866-869 dated Oct. 4, 2016 (4 pages).

(Continued)

*Primary Examiner* — Jean B Corrielus
(74) *Attorney, Agent, or Firm* — Crowell & Moring LLP

(57) ABSTRACT

A subscriber module of a fixed wireless access communication system comprises an offset Gregorian antenna arrangement, an array of antenna elements arranged as a feed, a beamforming network and a processor. The processor is configured to provide, to the beamformer, a pre-determined plurality of antenna weight vectors configured to form a plurality of beams, the orientations of the plurality of beams being arranged in a grid comprising a plurality of rows, each of the pre-determined plurality of antenna weight vectors being configured to form a respective beam from the primary reflector dish of the Gregorian antenna arrangement by forming a respective feed beam from the array of antenna elements. The relationship between the azimuth and elevation direction of each feed beam and the azimuth and elevation direction of the respective beam from the primary (Continued)

reflector dish is a non-linear function of azimuth and elevation.

16 Claims, 21 Drawing Sheets

(56) References Cited

U.S. PATENT DOCUMENTS

| | | | |
|---|---|---|---|
| 10,530,434 | B2 | 1/2020 | Zhao |
| 10,812,125 | B1 | 10/2020 | Badic |
| 11,621,754 | B2 * | 4/2023 | Aghajanzadeh ..... H04B 7/0617 375/267 |
| 2016/0037431 | A1 | 2/2016 | Kohli |
| 2016/0372835 | A1 | 12/2016 | Toso |
| 2017/0134076 | A1 | 5/2017 | Maamari |
| 2018/0331740 | A1 | 11/2018 | Orhan |
| 2020/0119790 | A1 | 4/2020 | Rao |
| 2020/0295469 | A1 | 11/2020 | Fenn |

OTHER PUBLICATIONS

Martinez-Lorenzo et al., "Zooming and Scanning Gregorian Confocal Dual Reflector Antennas," Sep. 2008 (10 pages).

International Search Report and Written Opinion of the International Search Authority mailed Apr. 19, 2022, in International Application No. PCT/EP2022/085289 (16 pp.).

Wei et al., "Multibeam Antenna Technologies for 5G Wireless Communications", IEEE Transactions on Antennas and Propagation, IEEE, USA, vol. 65, No. 12, Nov. 30, 2017, pp. 6231-6249, XP011673554, ISSN: 0018-926X, DOI: 10.1109/TAP.2017.2712819 [retrieved on Nov. 28, 2017] (19 pp.).

* cited by examiner

| S23.1 | Provide a pre-determined plurality of antenna weight vectors at the first station, the pre-determined plurality of antenna weight vectors being configured to form a plurality of beams, the orientations of the plurality of beams being arranged in a grid comprising a plurality of rows, the beams of each row being spaced in angular position in the row on a first axis, such that at least one beam in a respective row is positioned mid-way on the first axis between the positions on the first axis of two beams on an adjacent row |
|---|---|
| S23.2 | Select a first sub-set of the pre-determined plurality of antenna weight vectors for use at the first station |
| S23.3 | Form a succession of beams in a first time sequence at the first station using the first sub-set of the pre-determined plurality of antenna weight vectors to send first messages |
| S23.4 | Dependent on the receipt of a first message at the second station using a first beam at the first station, form a further succession of beams at the first station using a second sub-set of the pre-determined plurality of antenna weight vectors selected to form beams adjacent to the first beam |

*FIG. 23*

FORMING A BEAM FROM A SUBSCRIBER MODULE OF A FIXED WIRELESS ACCESS COMMUNICATION SYSTEM

CROSS-REFERENCE TO RELATED APPLICATIONS

This application is a continuation application of U.S. application Ser. No. 17/547,022, filed on Dec. 9, 2021, and titled "FORMING A BEAM FROM A SUBSCRIBER MODULE OF A FIXED WIRELESS ACCESS COMMUNICATION SYSTEM," which issued as U.S. Pat. No. 11,677,456 on Jun. 13, 2023, and which claims priority from UK Patent Application No. GB 2019618.4, filed on Dec. 11, 2020, the entirety of each of which is hereby fully incorporated by reference.

TECHNICAL FIELD

The present invention relates to a subscriber module of a fixed wireless access communication system, the subscriber module comprising an offset Gregorian antenna arrangement comprising a primary reflector dish and a secondary reflector and an array of antenna elements arranged as a feed for the secondary reflector, and to a method of forming a beam from the subscriber module.

BACKGROUND

There is a growing market for wireless systems operating at increasing high frequencies as demand for increased bandwidth continues and as the cost of radio frequency electronic devices falls. In particular for fixed wireless access systems, there is a requirement for radio stations to have a high antenna gain to provide sufficient system gain to establish communication over long distances, which may be of the order of a kilometre or further, at higher frequencies, which may by up to 60 GHz or even higher. To provide high gain antenna beams, an array of antenna elements may be conventionally provided in which the amplitude and/or phase of each antenna element is controlled by a beamformer to produce beams. However, the gain of a beam provided by the array of antenna elements may be limited by the number of elements in the array. It may be required to produce beams having a greater gain than may be provided by a given array.

SUMMARY

In accordance with a first aspect of the invention there is provided a subscriber module of a fixed wireless access communication system, the subscriber module comprising:
   an offset Gregorian antenna arrangement comprising a primary reflector dish and a secondary reflector;
   an array of antenna elements arranged as a feed for the secondary reflector, the array of antenna elements and the secondary reflector being offset in a vertical axis with respect to a centre of the primary reflector dish;
   a beamforming network, the beamforming network being configured to form a beam using an antenna weight vector; and
   a processor configured to provide an antenna weight vector selected from a pre-determined plurality of antenna weight vectors to the beamformer,
   wherein the processor is configured to provide the pre-determined plurality of antenna weight vectors configured to form a plurality of beams, the orientations of the plurality of beams being arranged in a grid comprising a plurality of rows, each of the pre-determined plurality of antenna weight vectors being configured to form a respective beam from the primary reflector dish of the Gregorian antenna arrangement by forming a respective feed beam from the array of antenna elements,
   wherein the relationship between the azimuth and elevation direction of each feed beam and the azimuth and elevation direction of the respective beam from the primary reflector dish is a non-linear function of azimuth and elevation.

Providing the offset Gregorian antenna arrangement provides a convenient method of increasing the gain of beams provided by the array of antenna elements. Offsetting the secondary reflector in a vertical axis with respect to a centre of the primary reflector dish allows beams to be formed over a broad range of azimuth angles without obstruction of the beam by the secondary reflector or the array. Providing a predetermined plurality of weight vectors is computationally efficient, by allowing the calculation of the weight vectors to be performed in advance of forming the beams. Arranging the orientations of the plurality of beams in a grid comprising a plurality of rows allows series of beams to be formed at different azimuth angles and at the same elevation, which allows a convenient method of forming trial beams, for example to establish initial communication between the subscriber module and an access point of the wireless communication system. This also allows a convenient method for re-selection of beams to track movement of a subscriber module due to wind loading, for example if the subscriber module is mounted on a pole above a subscriber's premises. Providing the predetermined plurality of weight vectors such that the relationship between the azimuth and elevation direction of each feed beam and the azimuth and elevation direction of the respective beam from the primary reflector dish as a non-linear function of azimuth and elevation allows the plurality of beams formed from the subscriber module to be arranged as a series of straight rows in a grid, by arranging the feed beams from the array of antenna elements as a distorted grid. This allows the processor to apply a simple algorithm to steer beams by selection of beams in a straight row.

In an example, the pre-determined plurality of antenna weight vectors is configured to form the plurality of feed beams such that the orientations of the plurality of beams is arranged in a distorted grid comprising a plurality of curved rows, each curved row providing a monotonic change in azimuth angle along the curved row, and a non-monotonic change in elevation angle along the curved row. Each curved row may have an offset in elevation angle between the centre of the curved row and either end of the curved row. The offset in elevation angle for a curved row may be equal to the angular spacing in elevation, at the centre of the curved row, between the curved row and an adjacent curved row +/−50%. This provides the plurality of beams as a grid comprising the plurality of rows which have a constant elevation to a good approximation. Typically, each curved row may have a greater elevation angle at the centre of the curved row than at either end of the curved row. In an example, each curved row has an approximately parabolic dependence of elevation angle on azimuth angle, within +/−50% of a true parabola.

In an example, the array of antenna elements has 8 element columns and 8 element rows with a spacing between antenna elements in each element row and in each element column of substantially half a wavelength at an operating frequency of the wireless communication system.

This allows commercially available antenna arrays to be used, which may, for example, be arranged to form approximately 100 beams, but which may not provide sufficient gain without the offset Gregorian antenna arrangement.

In accordance with a second aspect of the invention, there is provided a method of forming a beam from a subscriber module of a fixed wireless access communication system, the subscriber module having an offset Gregorian antenna system comprising a primary reflector dish, a secondary reflector, an array of antenna elements and a beamforming network, the beamforming network being configured to form a beam using an antenna weight vector selected from a pre-determined plurality of antenna weight vectors, wherein the array of antenna elements is arranged to feed the secondary reflector to form the beam from the primary reflector dish, the method comprising:

providing the pre-determined plurality of antenna weight vectors configured to form a plurality of beams, the orientations of the plurality of beams being arranged in a grid comprising a plurality of rows, each of the pre-determined plurality of antenna weight vectors being configured to form a respective beam from the primary reflector dish of the Gregorian antenna arrangement by forming a respective feed beam from the array of antenna elements, wherein the array of antenna elements and the secondary reflector are offset in a vertical axis with respect to a centre of the primary reflector dish, and the relationship between the azimuth and elevation direction of each feed beam and the azimuth and elevation direction of the respective beam from the primary reflector dish is a non-linear function of azimuth and elevation.

Further features and advantages of the invention will become apparent from the following description of examples of the invention, which is made with reference to the accompanying drawings.

BRIEF DESCRIPTION OF THE DRAWINGS

In order that the present invention may be more readily understood, examples of the invention will now be described, with reference to the accompanying drawings, in which:

FIG. 23 is a flow diagram of a method according to an example.

DETAILED DESCRIPTION

Examples of the invention are described in the context of a terrestrial fixed wireless access wireless communication system operating in the band of 57-66 GHz operating according to IEEE 802.11ay. In the described examples, the wireless communication system is a time division duplex wireless system. However, it will be understood that embodiments of the invention may relate to other applications, and to other frequency bands.

Figure 1:
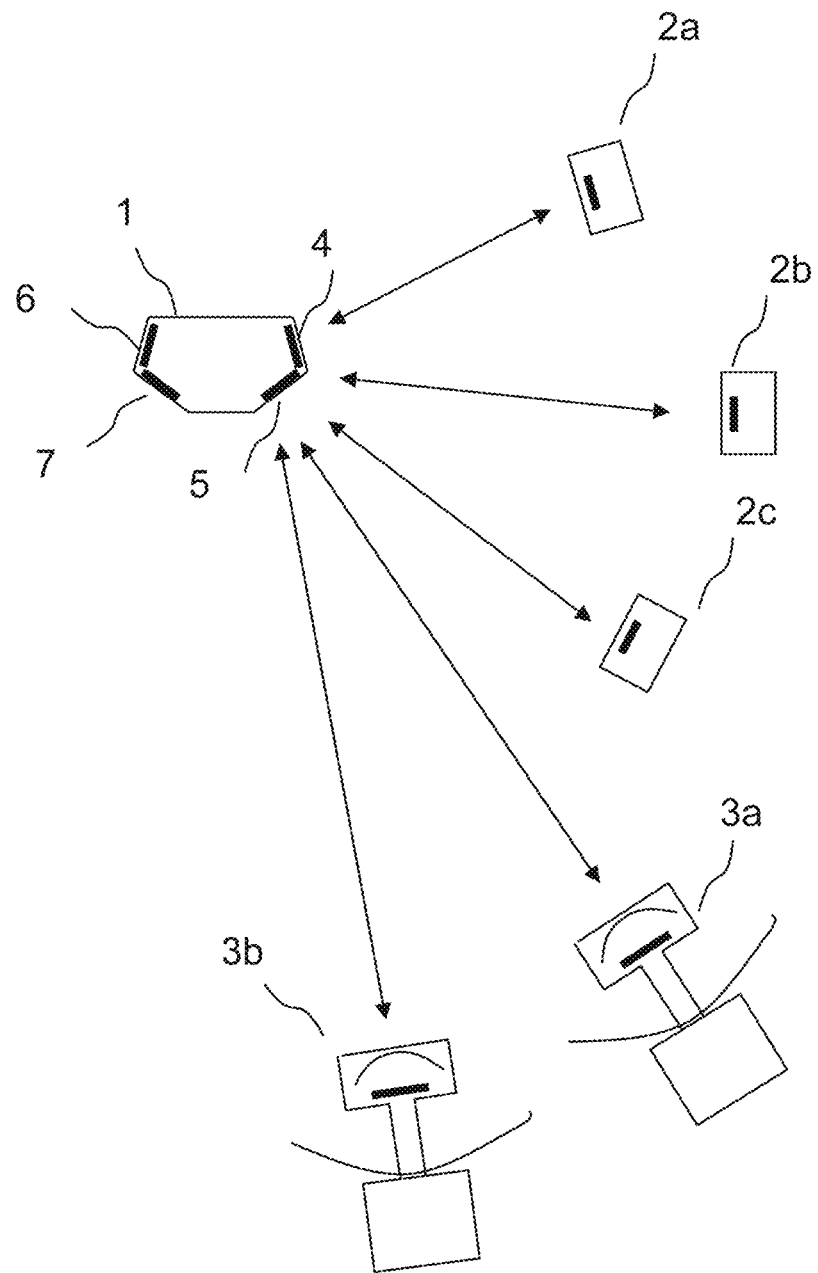
FIG. 1 is a schematic diagram showing a wireless communication system having an access point and subscriber modules each having an array of antenna elements.

FIG. 1 shows a wireless communication system having an access point 1 and subscriber modules 2a, 2b, 2c, 3a, 3b, in a schematic plan view. The access point 1 as shown covers two sectors, having two planar arrays of antenna elements 4, 5 arranged to cover a first sector, and two further antenna arrays 6, 7 arranged to cover a second sector. Each of the arrays is arranged to form beams within approximately +/−40 degrees in azimuth and +/−20 degrees in elevation of the bore sight direction of the array, that is to say perpendicular to the plane of the array. The two arrays covering a sector are arranged to have boresight directions which are different by approximately 80 degrees, so that beams may be formed in a continuous angular sector of approximately 160 degrees using the two arrays. Each element of the array of antenna elements is connected to a beamformer, which may be in the form of a commercially available beamforming radiofrequency integrated circuit arranged to apply a selected weighting vector comprising a respective transmission phase for each element of the array. For example, the array of antenna elements may be an 8×8 array of patch antenna elements spaced apart by approximately a half wavelength. The beamformer may be typically arranged to form a beam selected from a number of pre-configured beams, in an example 120 pre-configured beams. The pre-configured beams may be distributed over an angular sector of approximately +/−40 degrees in azimuth and +/−20 degrees in elevation.

In the fixed wireless access wireless communication system shown in FIG. 1, the access point 1 is typically located on a tower, and the subscriber modules may be a mix of high gain 3a, 3b and lower gain 2a, 2b, 2c subscriber modules, typically fixed to poles mounted at subscribers' premises, which may be commercial or private residential premises, for example. The lower gain subscriber module 2a, 2b, 2c have an antenna arrangement comprising a similar array of antenna elements to that used at the access point, and may be installed relatively close to the access point, typically within a few hundred metres. The high gain subscriber modules 3a, 3b have an antenna arrangement comprising a similar or the same array of antenna elements to that used at the access point, but the array is used as a feed for an offset Gregorian antenna arrangement, which gives an improved antenna gain and a narrower antenna beam, For the lower gain subscriber modules 2a, 2b, 2c, the array of antenna elements may be the same 8×8 array of patch antenna elements used at the access point, and the beamformer may also be arranged to form a beam selected from 120 pre-configured beams distributed over an angular sector of approximately +/−40 degrees in azimuth and +/−20 degrees in elevation in one example. To establish communication on first installation, the lower gain subscriber module 2a, 2b, 2c is aligned roughly in the direction of the access point, and the best beam for use can be selected by a sweep of possible beams at the subscriber module also sweeping possible beams at the access point, which my be an exhaustive search of each combination of beams, so that a best beam at the subscriber module and a best beam at the access point can be selected.

The higher gain subscriber modules 3a, 3b may be installed further from the access point, for example at distances of 1 km or more. The higher gain antenna arrangement may overcome the greater signal loss due the greater propagation distance and the effects of signal loss due to oxygen absorption and rain in the approximately 60 GHz band.

The high gain subscriber modules 3a, 3b typically use the same array of antenna elements and the same beamforming arrangement as used at the access point 1 and the lower gain subscriber modules 2a, 2b, 2c, as a feed for the offset Gregorian antenna system. The beam produced by the array of antenna elements is reflected by the secondary reflector of the offset Gregorian antenna system onto the primary reflector dish, to produce a narrower beam from the primary reflector dish than the beam produced by the array. For example, the beam produced by the array may be approximately +/−8 degrees between 3 dB points and the beam transmitted or received by the primary reflector dish may be approximately 0.7 degrees between 3 dB points. This reduced beamwidth gives an improvement in gain, which may provide approximately a 22 dB increase in gain in comparison with the gain of the antenna array alone. The overall gain of the antenna arrangement of the high gain subscriber module may be approximately 44 dBi (deciBels compared to isotropic) for this arrangement. The high gain antenna arrangement results in a reduction in the angular sector over which a beam may be formed. In the above example, the pre-configured beams may be distributed over an angular sector of approximately +/−2 degrees in azimuth and +/−1 degree in elevation from the primary reflector dish. The same technique of using a scan of the beams at the access point and the subscriber module is used to find a best beam, as for the lower gain subscriber modules. As a result of the narrower beams, and the smaller angular sector over which the beams may be steered, an optical sight attached to the high gain subscriber module is typically used to first of all install the subscriber module in an orientation in which the angular sector over which the beams may be steered includes the direction of the access point.

Figure 2:
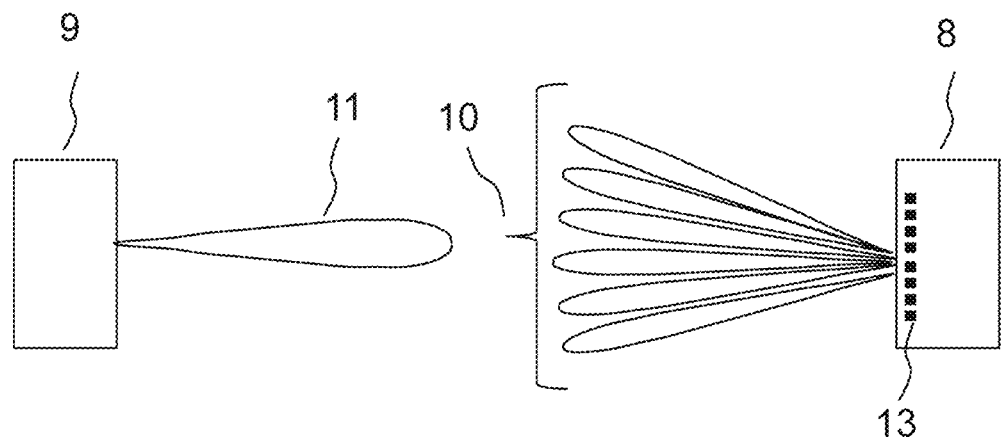
FIG. 2 shows a first wireless station configured to form a plurality of beams.

FIG. 2 shows a first wireless station 8, which may be a subscriber module or an access point, configured to form a plurality of beams 10 using an array of antenna elements 13, and a second wireless station 9, typically the other of the access point and the subscriber module, configured to form a fixed beam 11. In this case, only the first wireless station 8 performs the sweep to first beam.

Figure 3:
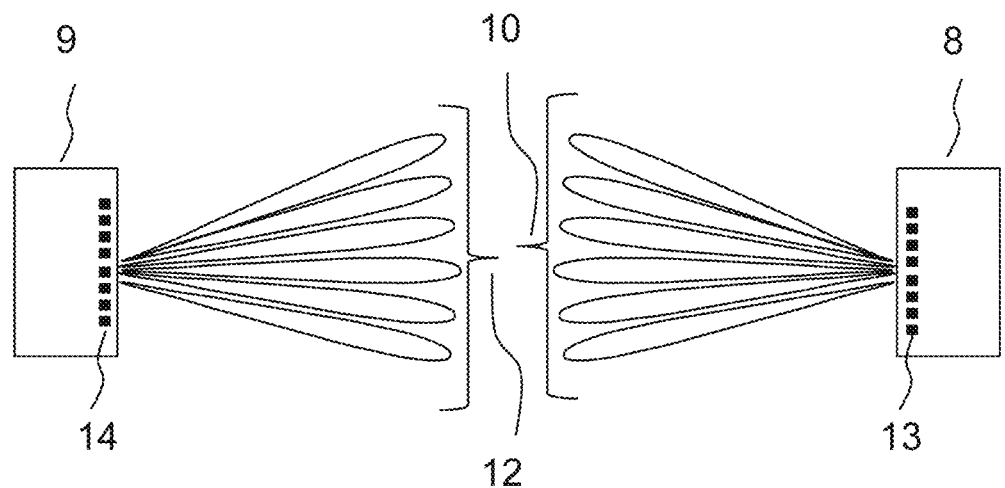
FIG. 3 shows a first and second wireless station each configured to form a plurality of beams.

FIG. 3 shows a first 8 and second 9 wireless station each configured to form a plurality of beams, 10, 12. The first wireless station may be a subscriber module and the second wireless station may be an access point. In another configuration, more than one access point may be used to form a meshed communication system. In this case, the first 8 and second 9 wireless stations may both be access points, and each will select a best beam for use by a search process as already described.

Figure 4A:
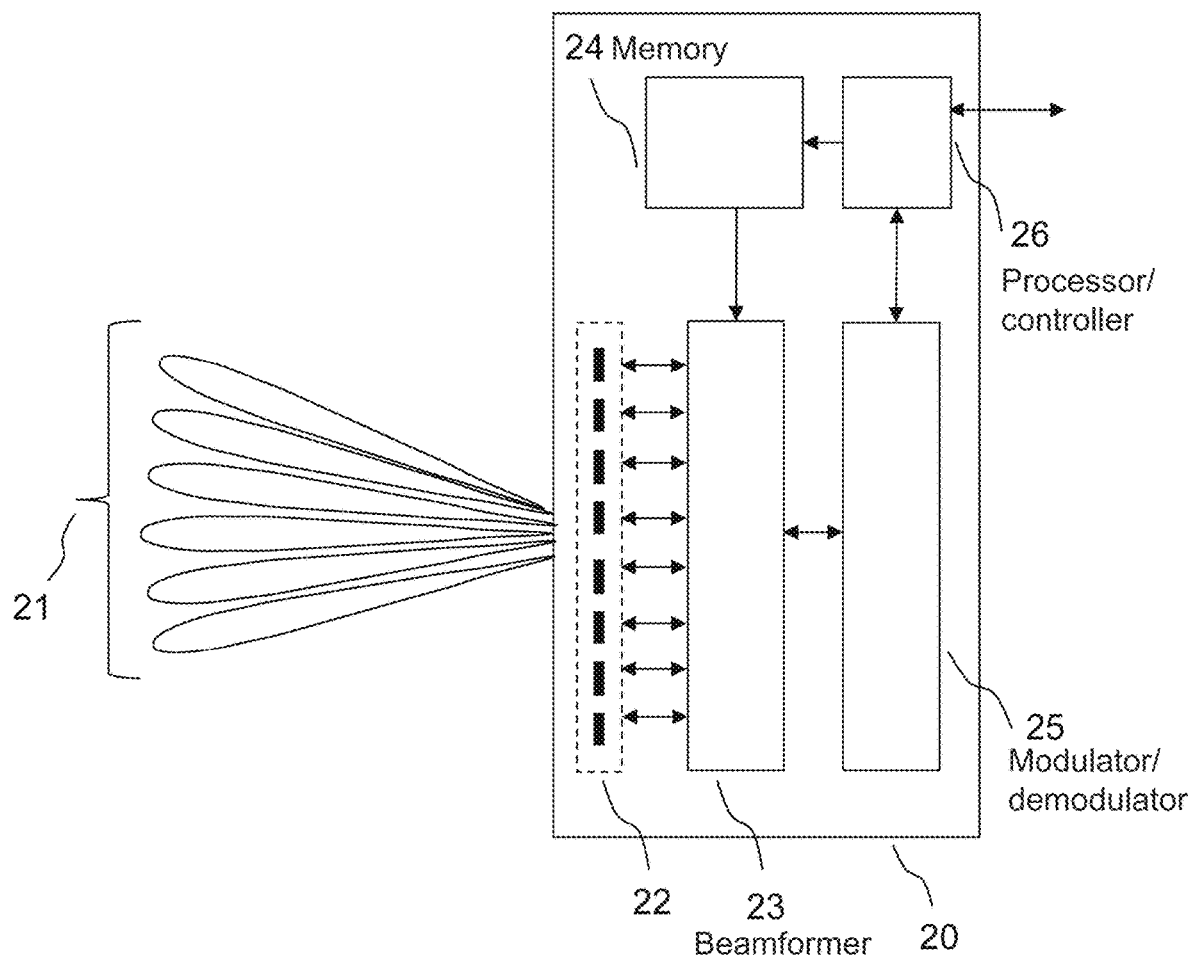
FIG. 4a shows a wireless station having an array of antenna elements and a beamformer.
Figure 4B:
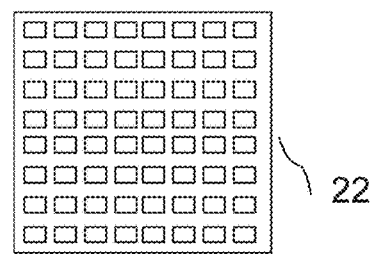
FIG. 4b shoes the array of antenna elements of FIG. 4b.

FIG. 4a shows a wireless station, which may be the first and/or the second wireless station. The wireless station has an array of antenna elements 22 and a beamformer 23. FIG. 4b shows that the array of antenna elements 22 comprises a two dimensional planar array of elements. The antenna elements may be conventional patch antenna elements formed by conductive metal film carried on a non-conductive substrate such as a ceramic tile or conventional printed circuit board material. Two, or more, planar arrays may be arranged with different boresight directions in azimuth in order to allow beams to be formed over a larger angular sector. The beamformer applies a weighting to the signal transmitted and/or received by each antenna element. Typically, the weighting is a transmission phase value. The transmission phase value is typically quantised, for example to allow switching by 90 degree steps. The application of the transmission phase value to the signal may be implemented by use of a switchable transmission delay. A combiner/splitter tree connects each element of the beamformer via a frequency converter stage to a radio modulator/demodulator 25, to convert received signals and/or signals for transmission to and from digital format. A processor and controller 26 controls the beam selection and acquisition stage. Pre-configured beams are stored in memory 24, for application to the beamformer 23 under control of the processor 26. The processor may be implemented using conventional digital techniques, and may be implemented in software, firmware or cloud-based processing. The formation of beams using phase weights applied to signals received by and/or transmitted by antenna elements is well known in the art. For example, a beam with a conventional sine function beam shape may be formed by applying weights the antenna elements with uniform gain and with an appropriate phase slope across the array in each dimension to steer the beam in the desired direction. The antenna array and beamformer may be commercially available items, for example the Samsung SWL-QD46 module.

Figure 5:
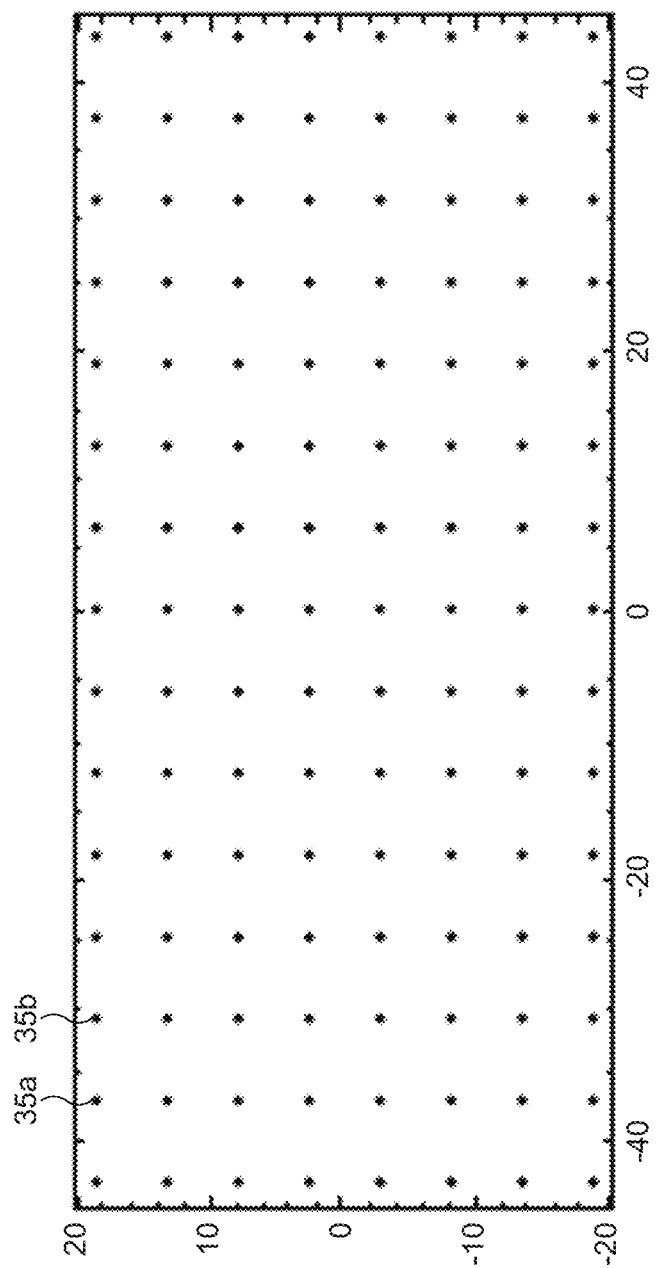
FIG. 5 shows a rectangular grid of pre-configured antenna beams.

FIG. 5 shows that the pre-determined plurality of antenna weight vectors may be configured to form a plurality of beams 35a, 35b, etc, the orientations of the plurality of beams being arranged in a rectangular grid. The reference numerals are shown as examples on only a few beams for clarity, but each of the beams shown is one of the plurality beams. This approach allows a search of beams for acquisition using a conventional search in a two-dimensional plane arranged as rows and columns as shown. By this approach, may be easily searched by incrementation of an index in each orthogonal dimension, typically in azimuth and elevation.

Figure 6:
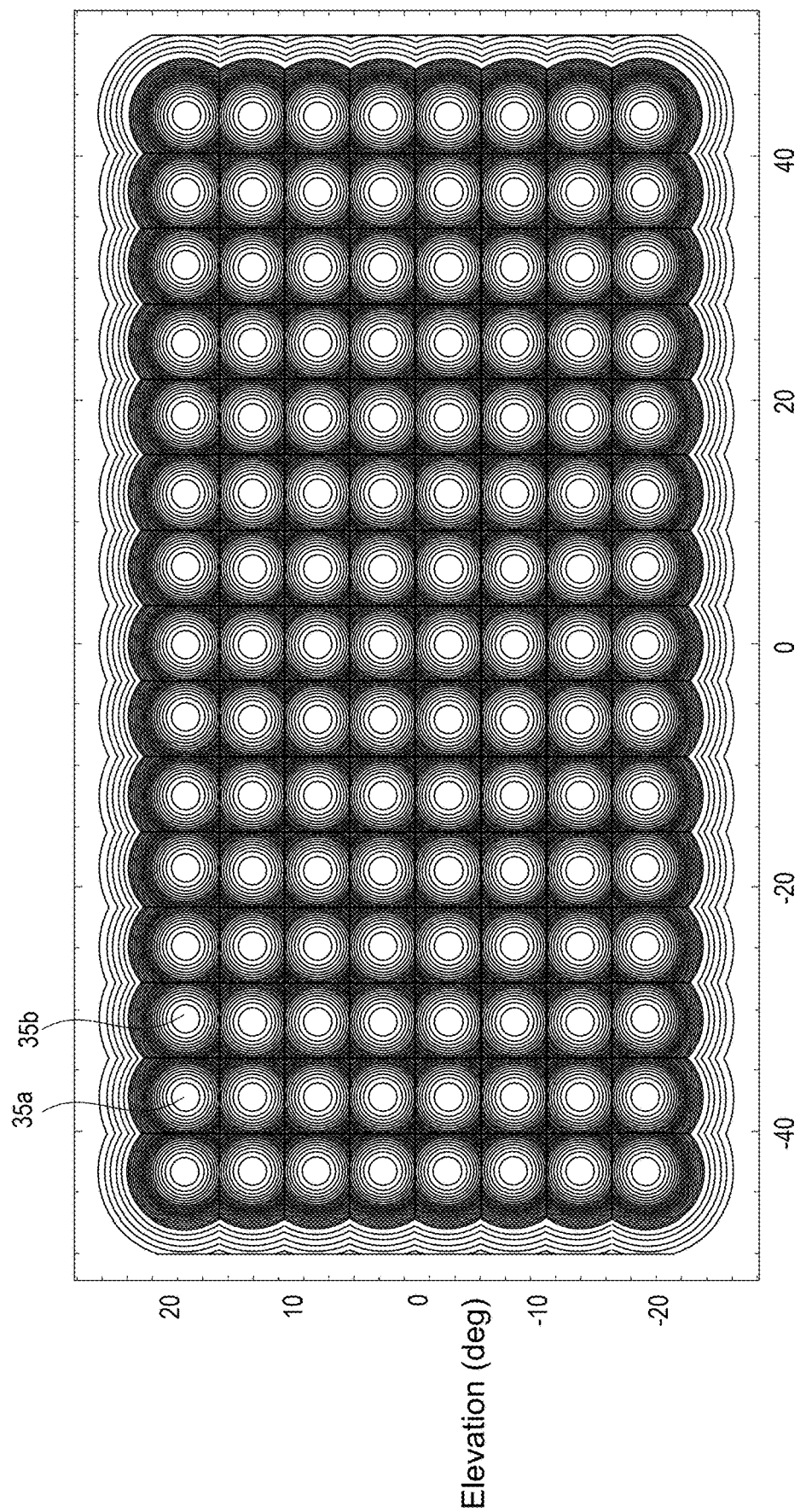
FIG. 6 shows an antenna plot of the rectangular grid of antenna beams of FIG. 5.
Figure 7:
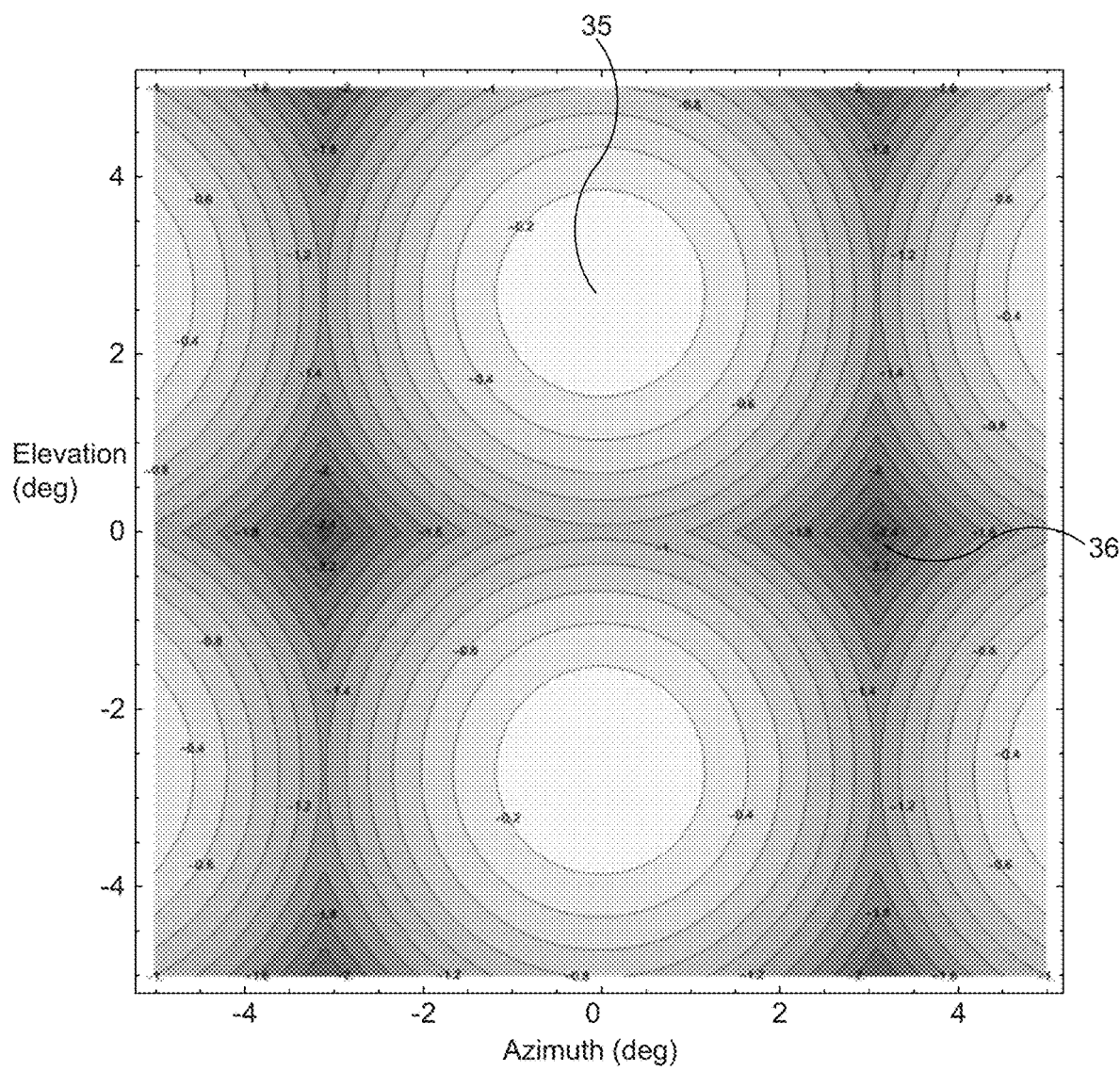
FIG. 7 shows a detail of FIG. 6.

FIG. 6 shows a plot of antenna gain for the beam arrangement of FIG. 5, showing the maximum gain that can be achieved at each point in the grid by selection of the best beam. FIG. 7 shows part of FIG. 6 in more detail. It can be seen that, in the troughs 36 between peaks of beams 35, the gain is approximately 2.4 dB below that of the peaks of the beams. The contours are in steps of 0.2 dB.

Figure 8:
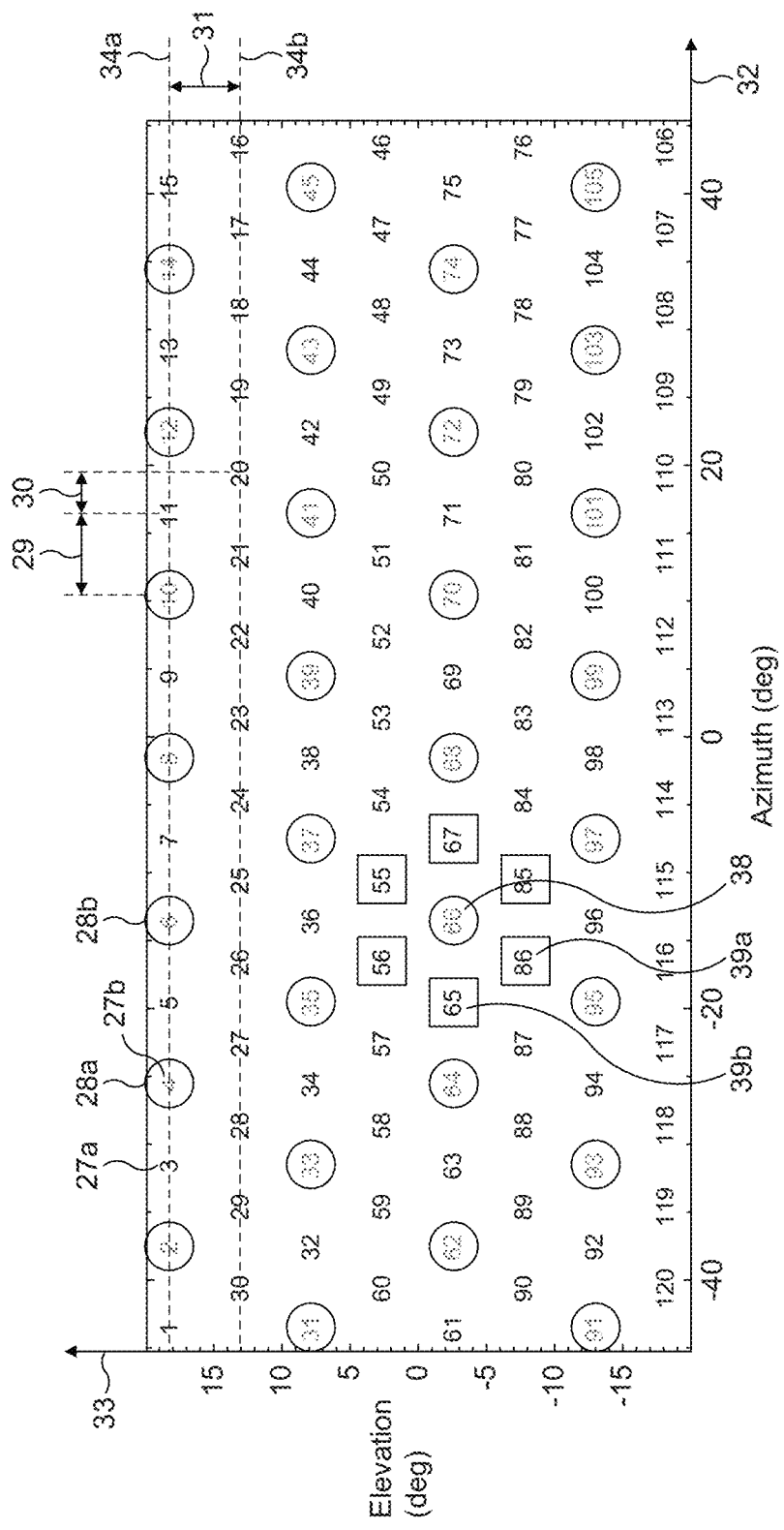
FIG. 8 shows a grid of pre-configured beams in a triangular arrangement.

By contrast, FIG. 8 shows that the pre-determined plurality of antenna weight vectors may be configured to form a plurality of beams 27*a*, 27*b*, etc., the orientations of the plurality of beams being arranged in an arrangement of equilateral triangles. The reference numerals are shown as examples on only a few beams for clarity, but each of the beams shown is one of the plurality beams, that is to say each of the beams numbered 1-120. The numbers in circles 28*a*, 28*b*, etc., are beams in the first subset of the plurality of beams used for an initial search and the numbers in squares 39*a*, 39*b*, etc., are beams in the second subset of the plurality of beams used for a refined search once a first beam, in this example beam number 66, that can allow communication the second station has been determined. As may be seen in FIG. 8, the beams of each row are spaced in angular position in the row on a first axis 32, such that at least one beam in a respective row is positioned mid-way on the first axis between the positions on the first axis of two beams on an adjacent row. For example, beam number 22 in row 34*b* is mid-way on the azimuth axis 32 between beam numbers 9 and 10 in row 34*a*.

Figure 9:
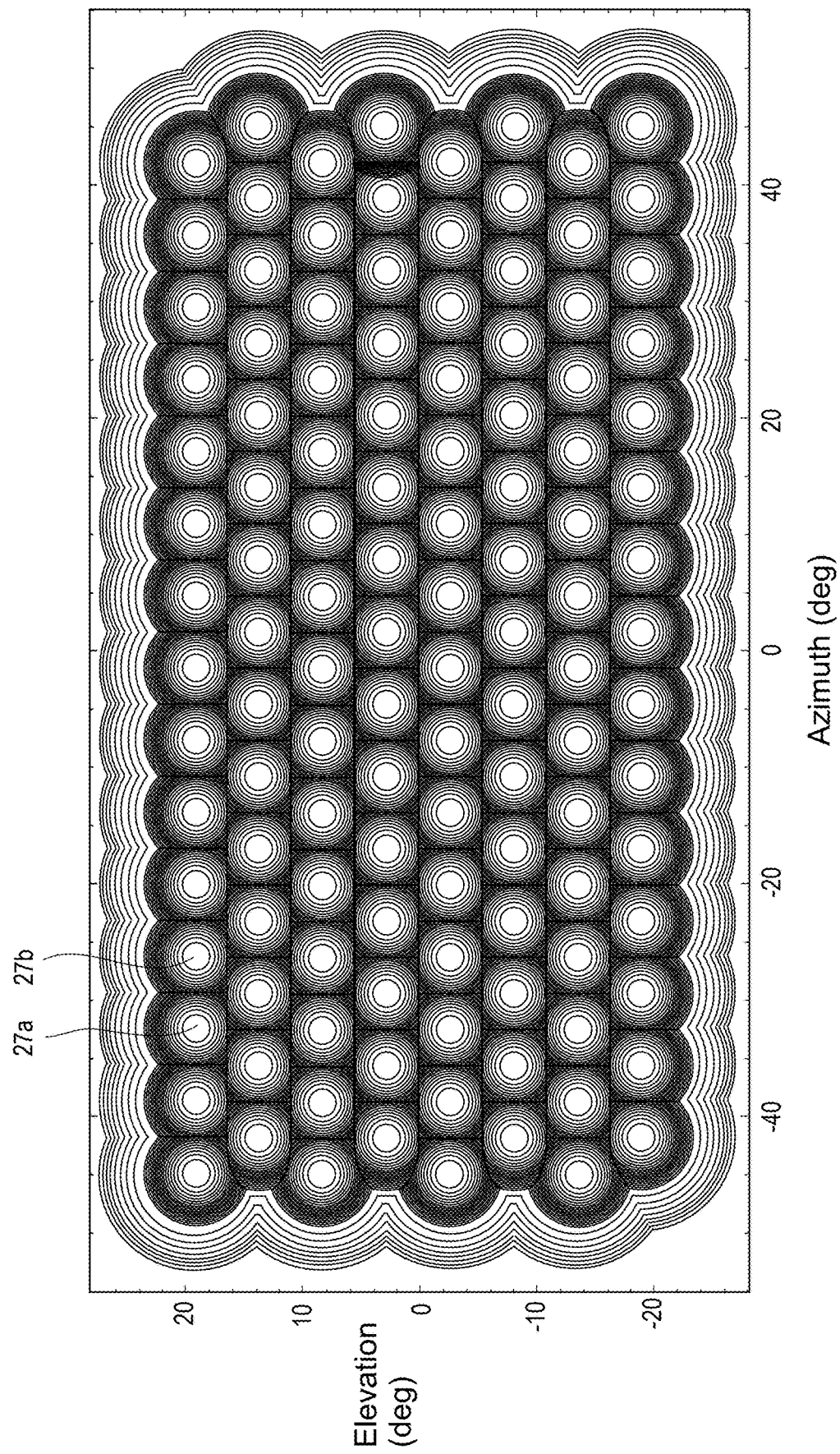
FIG. 9 shows an antenna gain plot of the triangular grid of FIG. 8.
Figure 10:
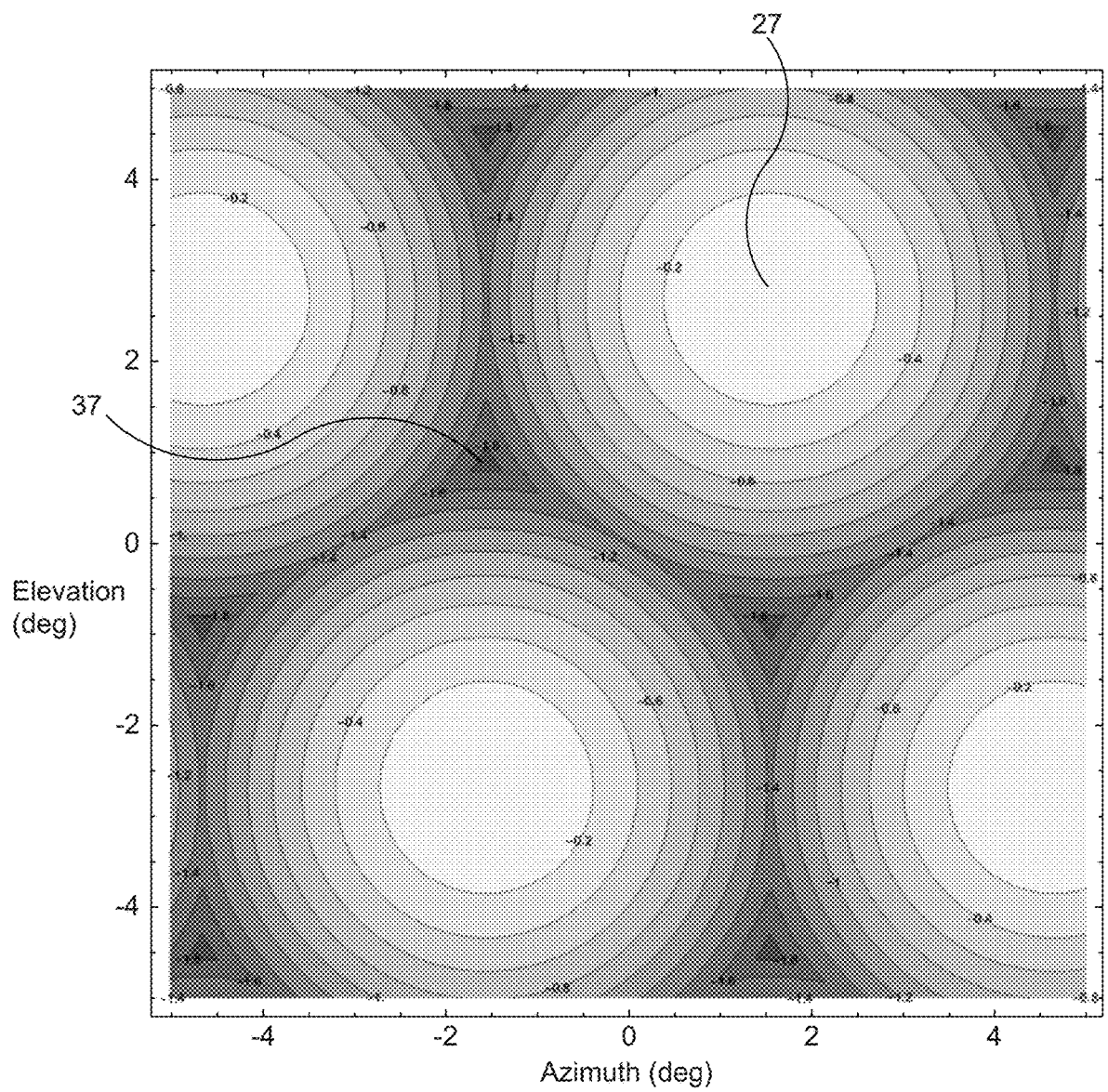
FIG. 10 shows a detail of FIG. 9.

FIG. 9 shows a plot of antenna gain for the beam arrangement of FIG. 8, showing the maximum gain that can be achieved at each point in the arrangement by selection of the best beam. FIG. 10 shows part of FIG. 9 in more detail. The contours are in steps of 0.2 dB. It can be seen that, in the troughs 37 between peaks of beams 27, the gain is approximately 1.8 dB below that of the peaks of the beams. This arrangement gives an improvement over the rectangular arrangement of FIG. 5 of about 0.6 dB in the minimum gain available. This improvement provides addition link margin to allow communication and acquisition in adverse atmospheric conditions.

To establish wireless communication between a first station and a second station in a wireless communication system, the following method may be used. The first station has an antenna comprising an array of antenna elements and a beamforming network, the beamforming network being configured to form a beam using an antenna weight vector selected from a pre-determined plurality of antenna weight vector. The pre-determined plurality of antenna weight vectors may be referred to as a codebook.

The pre-determined plurality of antenna weight vectors are configured to form a plurality of beams. The position of each of the plurality of beams is shown overlaid as illustrated in FIG. 8. The orientations of the beams are arranged in a grid comprising a plurality of rows 34*a*, 34*b*, etc., the beams of each row being spaced in angular position in the row by a first angular separation 29 on a first axis 32, in this example azimuth. The angular positions of the beams of each row is offset 30 on the first axis 32 by half of the first angular separation 29 with respect to the angular positions of beams in an adjacent row. For example, it can be seen that each beam 27*a*, 27*a*, etc., in row 34*a* is offset by half the separation between beams 29 with respect to the angular positions of beams in an adjacent row 34*b*. The beam numbers 1-120 shown in FIG. 8 are arbitrary.

As shown in FIG. 8, each row is separated from an adjacent row by the first angular separation 29 multiplied by cosine 30 degrees on a second axis, perpendicular to the first axis 32, so that each beam of the plurality of beams is arranged as an equilateral triangle with two adjacent beams. For example, row 34*a* is separated from row 34*b* by the first angular separation 29 multiplied by cosine 30 degrees. In practice the positions of the beams will be subject to errors due to the accuracy of the beamforming weights, taking into account the effects of quantisation.

For an initial acquisition search, a first sub-set of the pre-determined plurality of antenna weight vectors is selected, as shown as circled beams 28*a*, 28*b*, etc. In this case 30 beams are selected for the sub-set, being 1 in 4 beams.

Figure 11:
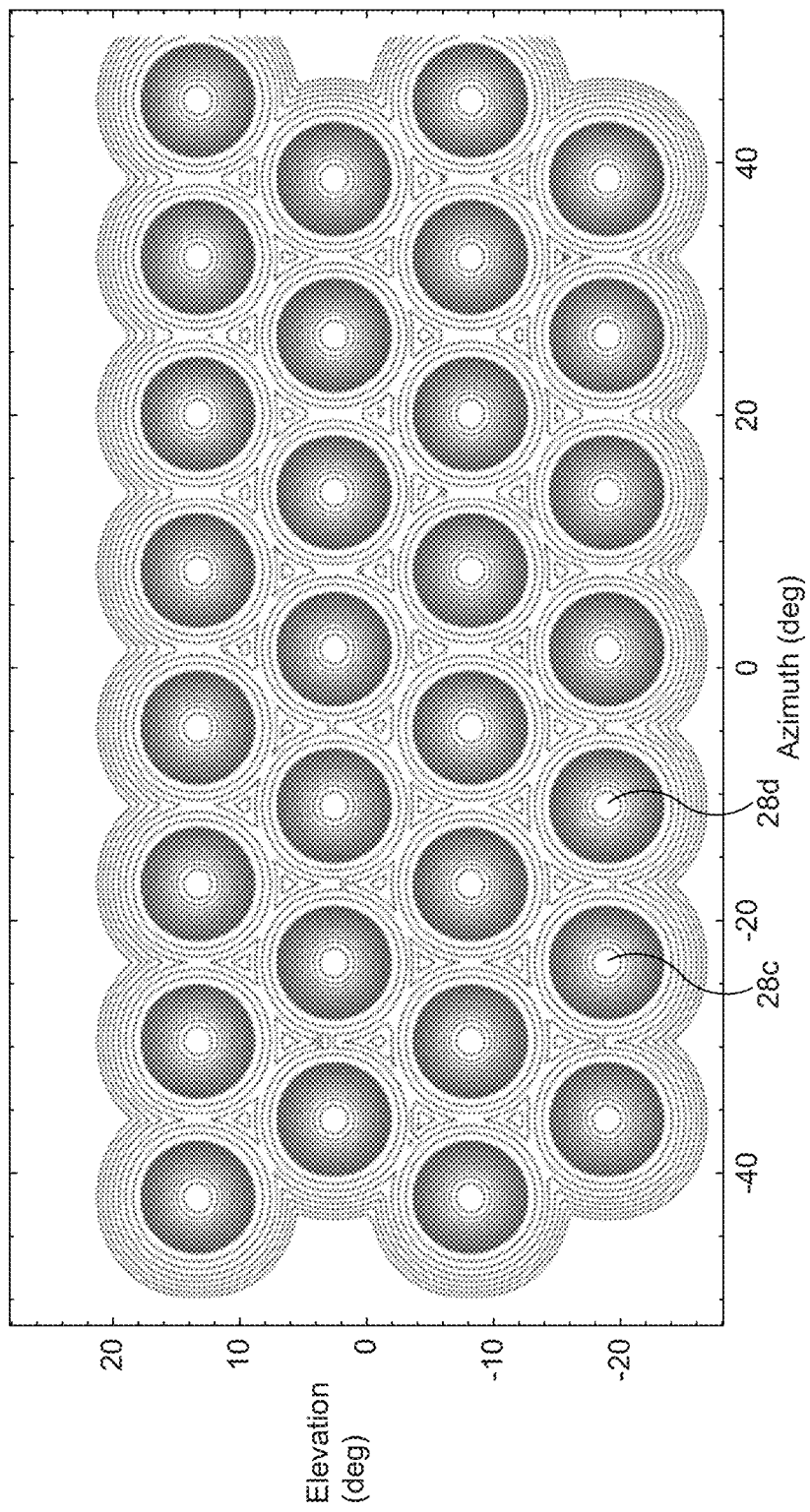
FIG. 11 shows an antenna gain plot of the triangular grid of a subset of beams of FIG. 8, formed by a sub-set of the pre-determined plurality of antenna weight vectors.

FIG. 11 shows an antenna gain plot of the triangular grid of the subset of beams 28*c*, 28*d*, etc., formed by a sub-set of the pre-determined plurality of antenna weight vectors. The sub-set, which is referred to as the first sub-set, is selected to form selected beams on alternate rows of the grid, the selected beams of each alternate row being spaced in angular position on the first axis by twice the first angular separation, and the angular position of the selected beams of each alternate row being offset on the first axis by the first angular separation. This arranges each selected beam in the subset as an equilateral triangle with two adjacent selected beams. This arrangement provides a minimum gain between peaks of beams in the sub-set of approximately −5.5 dB. This gives an improvement in link margin for initial acquisition compared with the minimum gain between peaks for a rectangular grid of beams because of the tighter packing of the triangular arrangement.

In an alternative another proportion of the beams may be selected for the sub-set other than 1 in 4, for example 1 in 9 beams. In each case a triangular arrangement shows an advantage.

In the acquisition process, a succession of beams is formed in a first time sequence at the first station using the first sub-set of the pre-determined plurality of antenna weight vectors to send first messages.

Dependent on the receipt of a first message at the second station using a first beam at the first station, a refined search is carried out using a further succession of beams is formed at the first station using a second sub-set of the pre-determined plurality of antenna weight vectors selected to form beams adjacent to the first beam. As shown in FIG. 8, marked by squares, the second sub-set is selected to form at least a ring of six beams surrounding the respective first and second beams if the first or second beam is not at an edge of the grid. The second sub-set of beams is shown in FIG. 8 by the beams marked by squares, 39*a*, 39*b*, etc., which surround the first beam 38 which was selected in the initial acquisition process. This provides an efficient process for selecting a best beam for use after establishing initial communication.

As already mentioned, the array of antenna elements of the first station may be arranged to feed a secondary reflector of an offset Gregorian antenna arrangement, to increase the antenna gain. This may be beneficial for a subscriber module, an access point, or for a wireless station arranged in a mesh arrangement where more gain is required.

Figure 12:
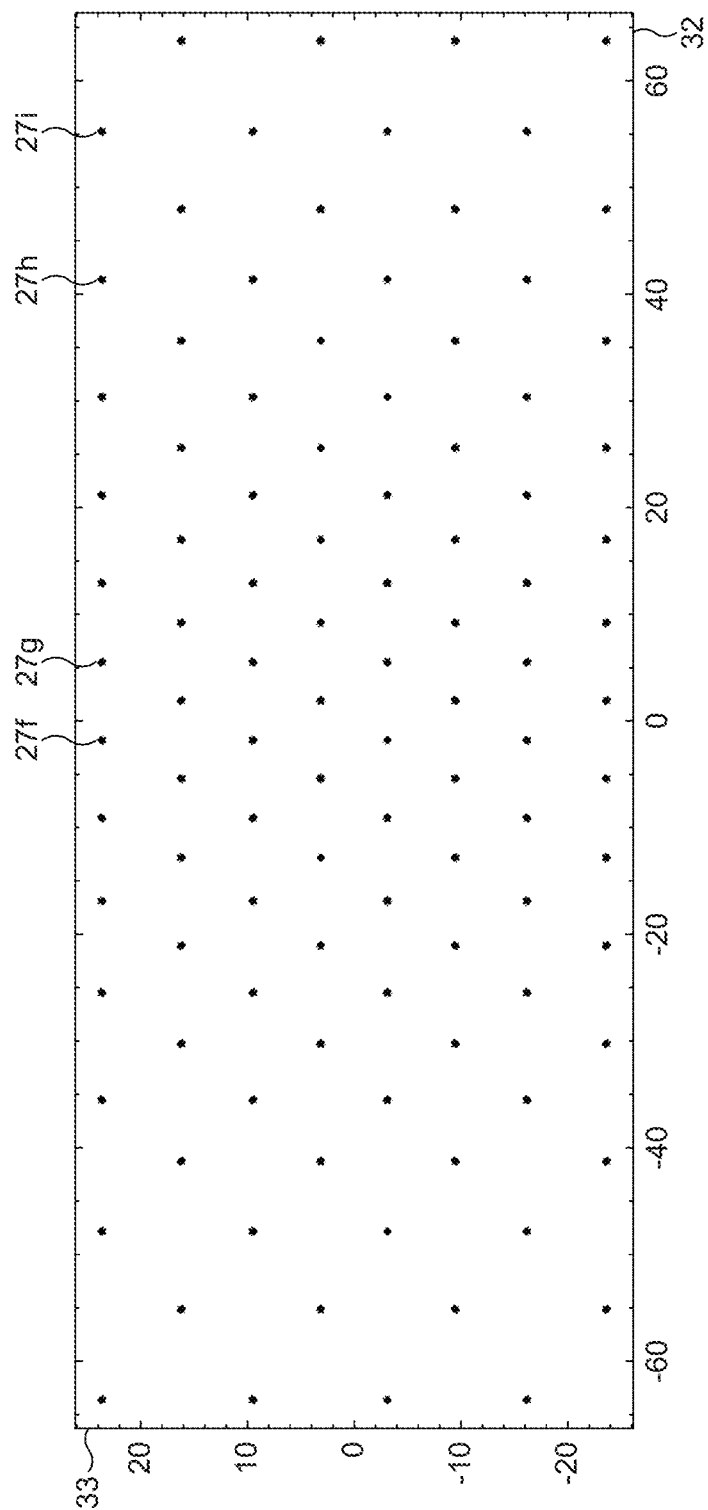
FIG. 12 shows a grid of pre-configured beams in a triangular arrangement having spacing on a row in proportion to beamwidth.

FIG. 12 shows an alternative arrangement of the grid of pre-configured beams in a triangular arrangement having spacing on a row in proportion to beamwidth. It can be seen that beams at the centre of a row 27*f*, 27*g* have a closer angular spacing than beams towards the end of a row 27*h*, 27i. The spacing is constant in terms of a proportion of the 3 dB beamwidth of a beam. This may provide a means of reducing the number of beams which need to be searched in an acquisition process. The reduction of gain between the areas between beams may be kept approximately constant across the grid of beams by this approach.

Figure 13:
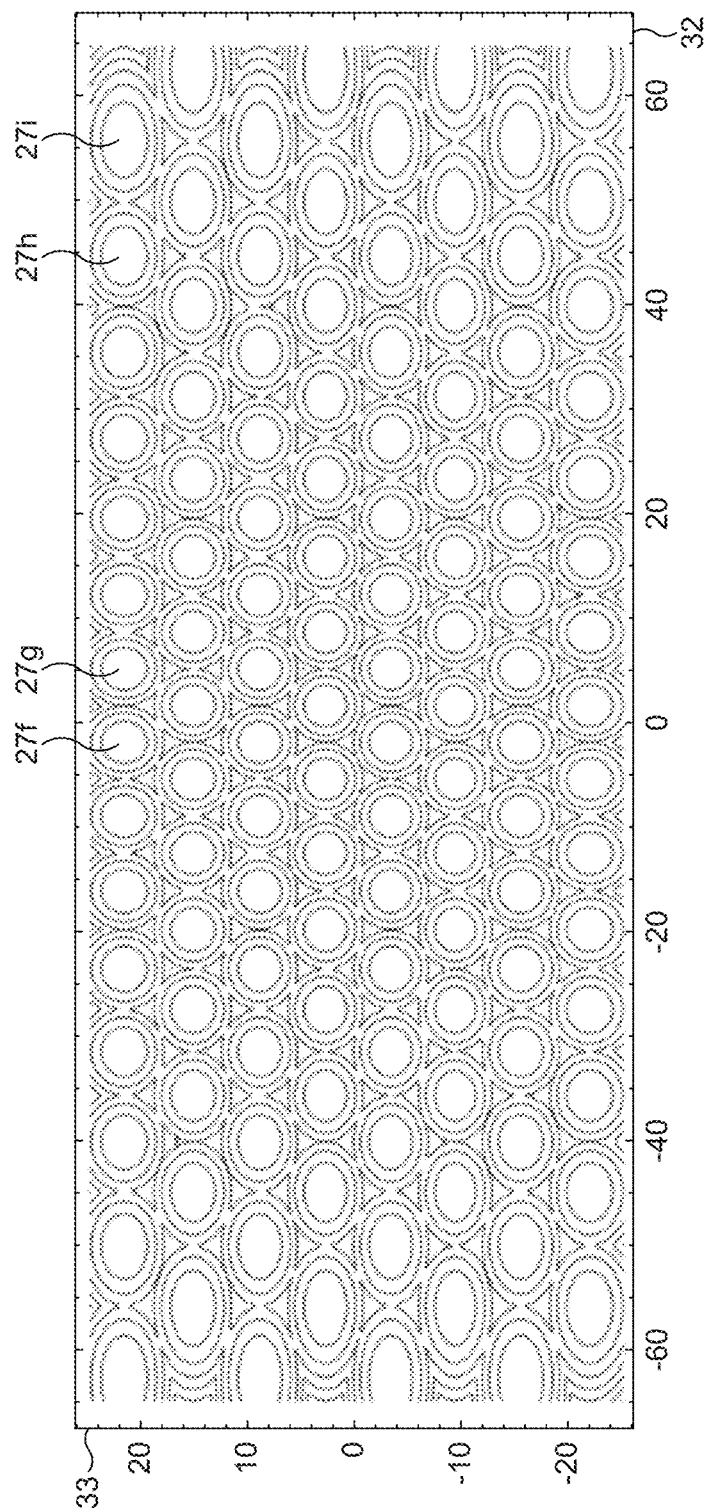
FIG. 13 shows an antenna gain plot of the grid of FIG. 12.

FIG. 13 shows an antenna gain plot of the grid of FIG. 12 in schematic form.

Figure 14:
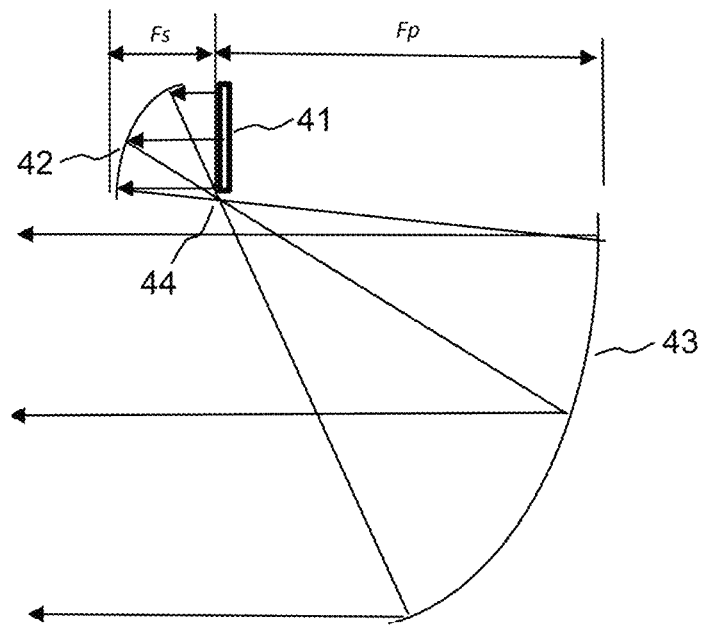
FIG. 14 is a schematic diagram showing the principle of operation of an offset Gregorian antenna arrangement with a planar array of antenna elements as a feed.

FIG. 14 is a schematic diagram showing the principle of operation of an offset Gregorian antenna arrangement, having a primary reflector dish 43 and a secondary reflector 42. An array of antenna elements 41 is used to feed the secondary reflector 42 with radiofrequency radiation formed into a first beam having a first beamwidth. The amplitude and/or phase of the signals fed to/received from respective elements of the array are arranged to have appropriate values to form a beam of intended direction and beamwidth. The amplitude and/or phase of the signals fed to/received from respective elements is typically controlled by a beamformer implemented by a radiofrequency integrated circuit. The effect of the combination of the primary reflector dish 43 and the secondary reflector 42 is to increase the gain of the first beam, producing a second beam of reduced beamwidth. For example, the first beam may have a beamwidth, measured as being the angular distance between points of the radiation beam that have a gain 3 dB lower than the gain in the centre of the beam, of approximately 8 degrees, and the second beam may have a beamwidth of approximately 0.5 degrees.

Figure 15:
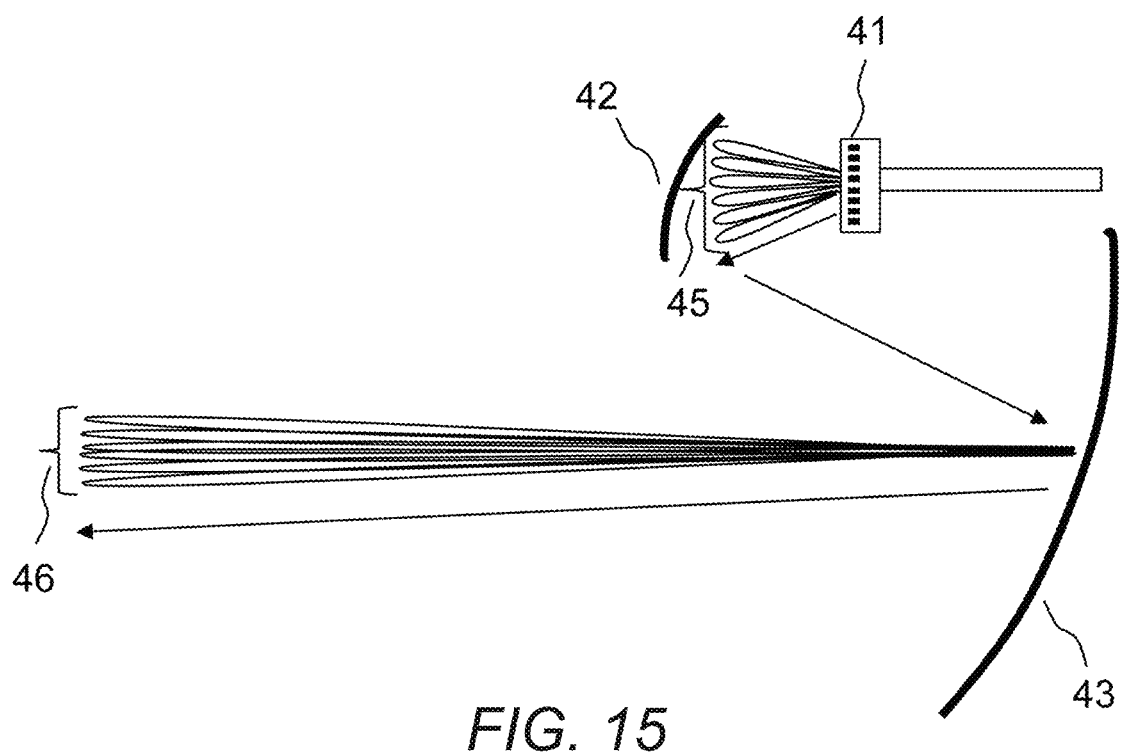
FIG. 15 shows a plurality of feed beams formed to feed a secondary reflector of an offset Gregorian antenna arrangement.

FIG. 15 shows a plurality of feed beams 45 formed from the array of antenna elements 41 to feed the secondary reflector 42 of the offset Gregorian antenna arrangement, to produce a plurality of beams 46 from the primary reflector dish 43. It can be seen that a given deviation of a feed beam from a direction perpendicular to the array will result in a smaller deviation in the beam of from the primary reflector dish 43. As a result, the angular sector in which beams 46 from the primary reflector dish may be formed is narrower than the angular sector in which beams 45 from the primary reflector dish may be formed. Each feed beam corresponding to a respective one of the plurality of beams from the primary reflector dish.

Figure 16:
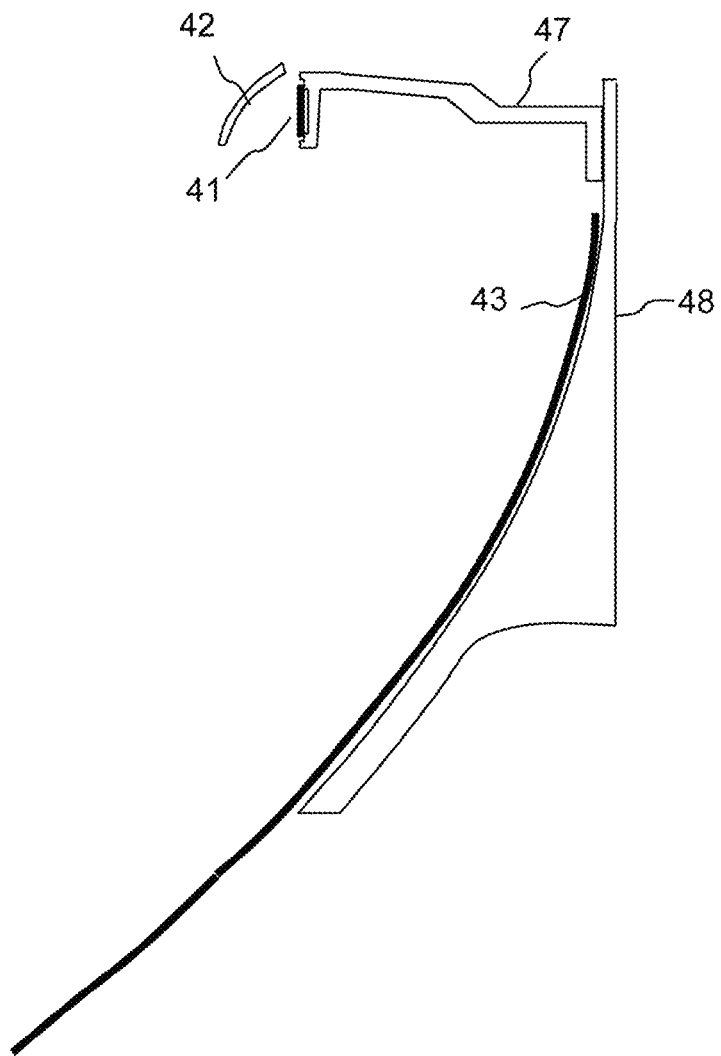
FIG. 16 shows a schematic diagram of a cross-section of the offset Gregorian antenna arrangement.

FIG. 16 shows an example of an implementation of an offset Gregorian antenna arrangement in the example of a high gain subscriber module, showing the secondary reflector 42 and a planar array of antenna elements 41 arranged as a feed for transmitting radio frequency signals to the secondary reflector 42, and/or for receiving radio frequency signals from the secondary reflector 42. A conductive support block is configured to support the planar array of antenna elements 41. The support block is formed as a first end of a feed support member 47, the feed support member being directly connected, at an end opposite the first end, to a support body 48 configured to support the primary reflector dish 43.

Figure 17B:
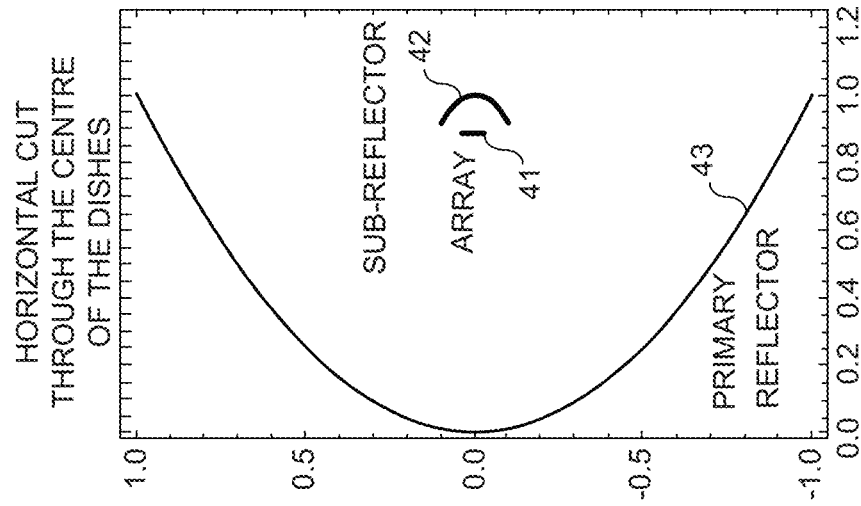
FIGS. 17a and 17b are schematic diagrams showing the shape the primary reflector dish and the secondary reflector in a cross-section in a vertical and horizontal cross-section respectively.
Figure 17A:
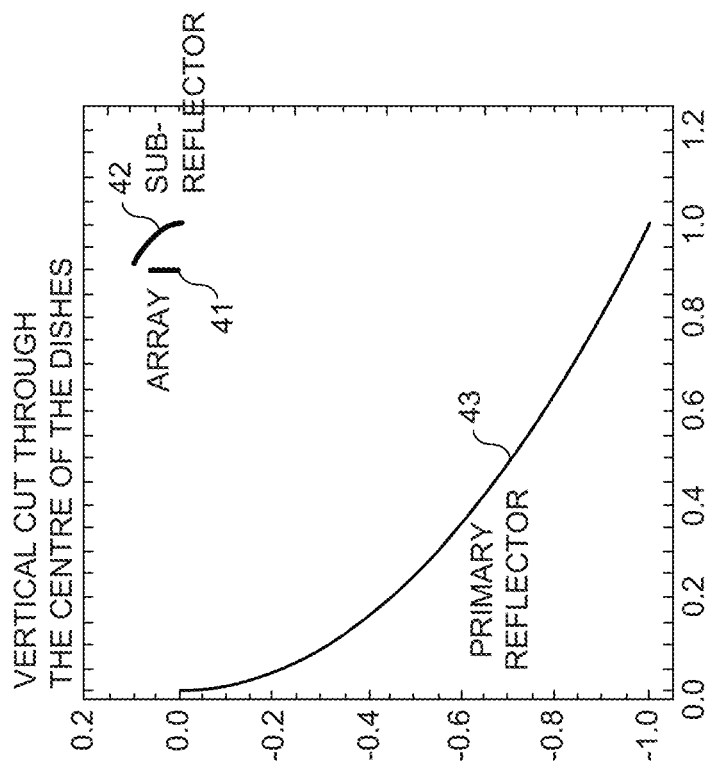

FIG. 17a shows a typical profile, in a vertical cross-section through the offset Gregorian antenna arrangement, in a similar plane to that of the cross-section of FIG. 16. The reflector surfaces are shown of the primary reflector dish 43 and the secondary reflector 42. A practical implementation may comprise reduced sections of the theoretical curves shown in FIGS. 17a and 17b. The offset Gregorian arrangement is arranged so that the secondary reflector and the array of antenna elements do not obscure the sector in which beams are intended to be formed from the primary reflector dish. Typically, the secondary reflector is offset vertically, so that the azimuth sector is not obstructed. Typically, in a fixed wireless access system, a smaller angular range, over which beams are formed, is needed in elevation than in azimuth. The planar array of antenna elements 41 is also shown. FIG. 17b shows a typical profile, in a horizontal cross-section through the offset Gregorian antenna arrangement, again showing the reflector surfaces of the primary reflector dish 43 and the secondary reflector 42, and the planar array of antenna elements 41. The primary reflector dish 43 has a parabolic shape in both the vertical and horizontal cross-sections. The secondary reflector dish 42 also has a parabolic shape in both the vertical and horizontal cross-sections.

Figure 18:
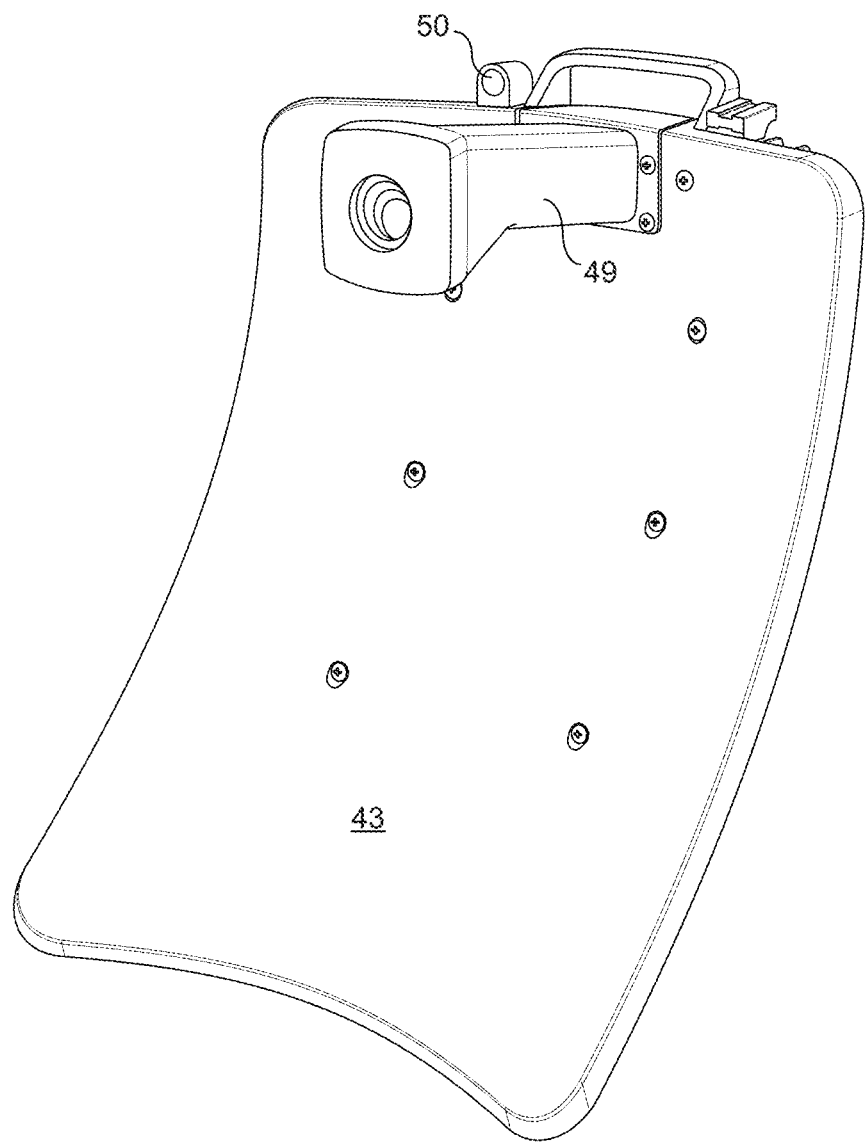
FIG. 18 shows an oblique perspective view of a first wireless station having the offset Gregorian antenna arrangement.

FIG. 18 shows an oblique perspective view of a wireless station having the offset Gregorian antenna arrangement in an example, showing an aperture 50 for align the wireless station with a second wireless station by sight, the primary reflector dish 43, and a non-conductive enclosure 49 enclosing the secondary reflector and its support.

Figure 19:
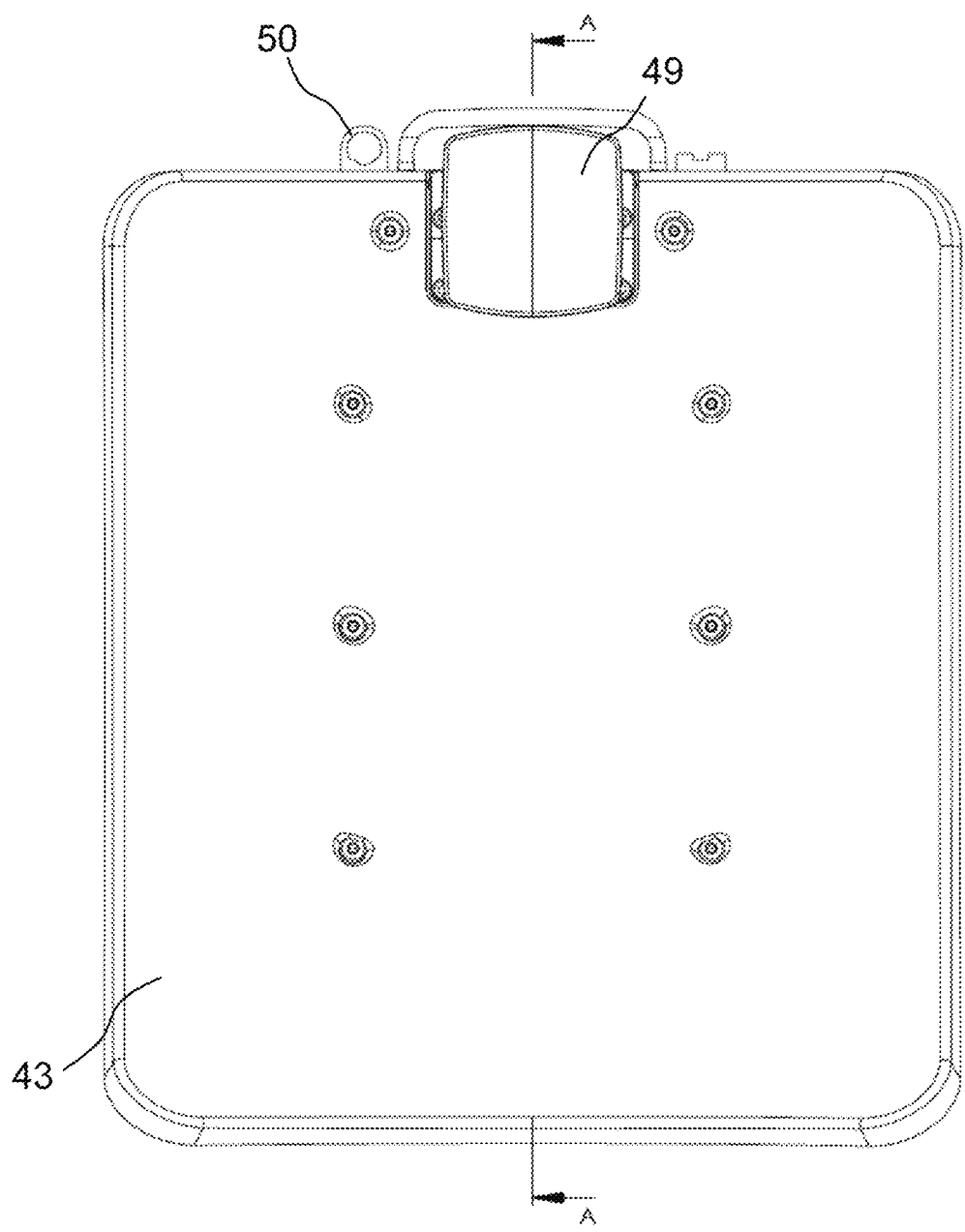
FIG. 19 is a plan view of the first wireless station, viewed from the direction of a radiofrequency main beam which the offset Gregorian antenna arrangement is configured to form.

FIG. 19 is a view of the offset Gregorian antenna arrangement from the direction of a radiofrequency main beam which the offset Gregorian antenna arrangement is configured to form, in an example. It can be seen that the primary reflector dish 43 is substantially rectangular in plan view, viewed from a direction parallel to the direction of a radiofrequency main beam which the offset Gregorian antenna arrangement is configured to form. The primary reflector dish 43 may be formed of pressed metal. This arrangement has been found to provide a compact design with high radiofrequency gain. The secondary reflector, which is covered by the enclosure 49, may also have a substantially rectangular in plan view, viewed from a direction parallel to the direction of a radiofrequency main beam which the offset Gregorian antenna arrangement is configured to form.

Figure 20:
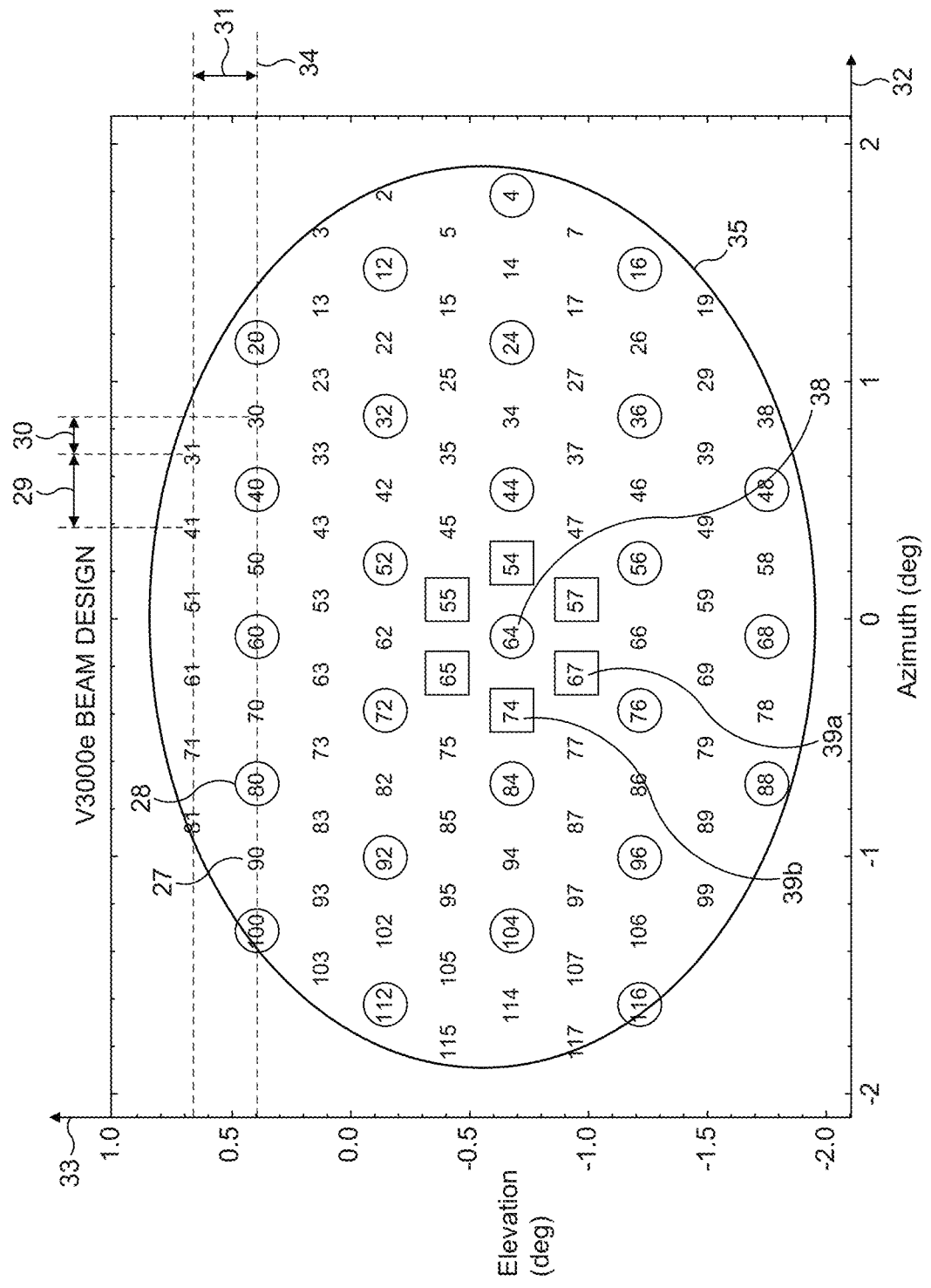
FIG. 20 shows a grid of a plurality of pre-configured beams formed from the primary reflector of an offset Gregorian antenna arrangement.

In the case of the Gregorian antenna arrangement, the pre-determined plurality of antenna weight vectors are configured to form a plurality of beams from the primary reflector dish 43 as shown in FIG. 20. FIG. 20 shows that the position of each of the plurality of beams is overlaid, in a similar arrangement to that of FIG. 8. In the case of FIG. 18, a reduced set of beams is used for communication, shown within an ellipse 35. At least some of the rows are truncated at each end. The resulting truncated rows are longest towards the centre of the range of elevation values.

Similarly as for the case of FIG. 8 without an offset Gregorian antenna system, the orientations of the beams are arranged in a grid comprising a plurality of rows 34, the beams of each row being spaced in angular position in the row by a first angular separation 29 on a first axis 32, in this example azimuth. The angular positions of the beams of each row is offset 30 on the first axis 32 by half of the first angular separation 29 with respect to the angular positions of beams in an adjacent row. For example, it can be seen that each beam in row 34 is offset by half the separation between beams 29 with respect to the angular positions of beams in an adjacent row.

The beam numbers, selected from a 1-120 range, shown in FIG. 20 relate to an optional the special case of an order of addressing each beam in a search process, in which every fourth numerical beam is selected to form the first sub-set of beams. The second subset of beams may be selected by selecting the preceding 10 and following 10 beams in numerical order of the numbering system. This selects a second subset of beams which at least includes the six beams surrounding a selected beam. This provides a simple algorithm for selecting beams.

As shown in FIG. 20. each row is separated from an adjacent row by the first angular separation 29 multiplied by cosine 30 degrees on a second axis, perpendicular to the first axis 32, so that each beam of the plurality of beams is arranged as an equilateral triangle with two adjacent beams. In practice the positions of the beams will be subject to errors due to the accuracy of the beamforming weights, taking into account the effects of quantisation.

For an initial acquisition search, a first sub-set of the pre-determined plurality of antenna weight vectors is selected, as shown as circled beams 28. In this case 26 beams are selected for the sub-set.

Figure 21:
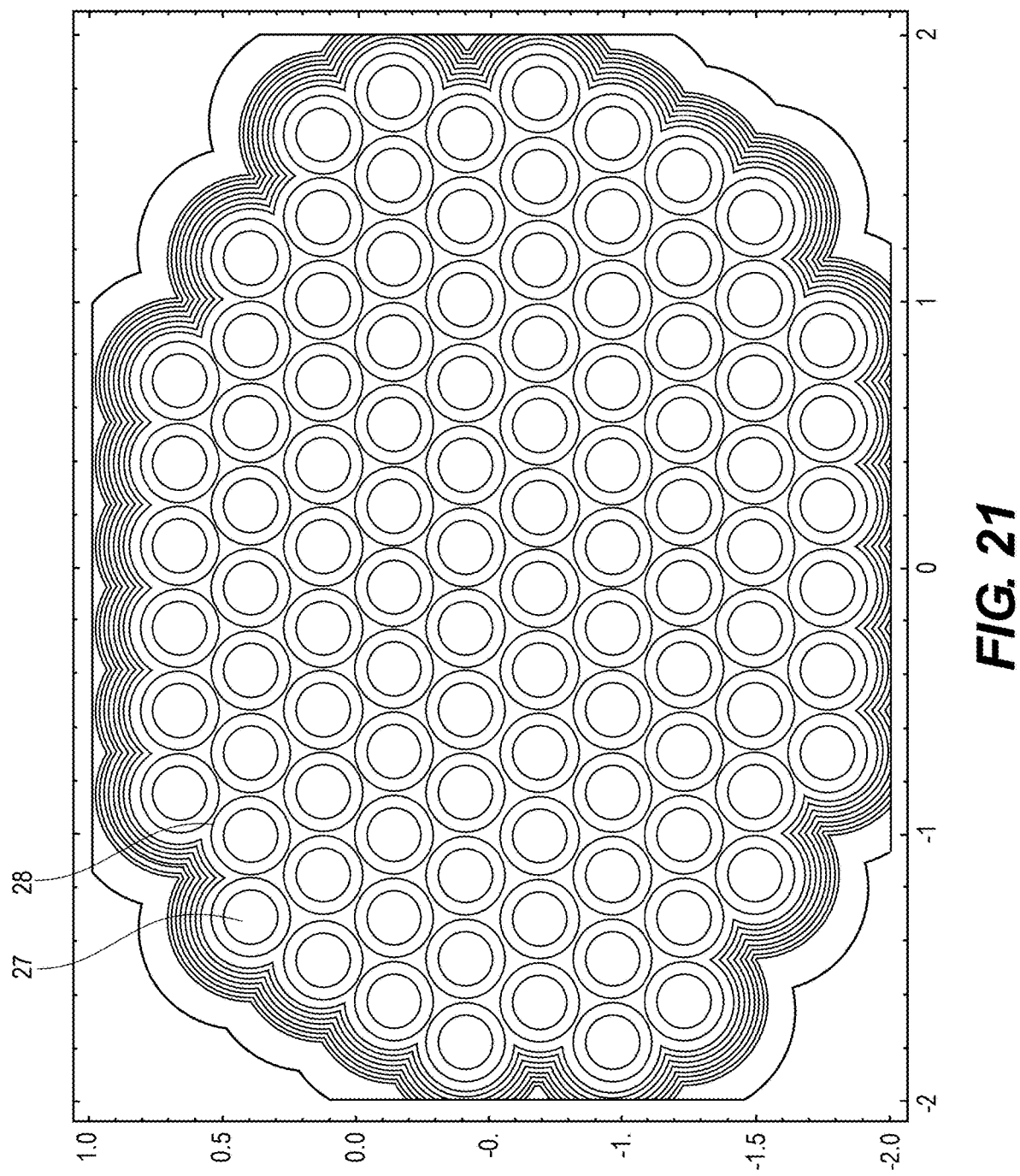
FIG. 21 is an antenna plot of the grid of FIG. 20.

FIG. 21 shows a plot of antenna gain for the beam arrangement of FIG. 17, showing the maximum gain that can be achieved at each point in the arrangement by selection of the best beam, similarly to FIG. 9. The contours are in steps of 1 dB.

Similarly as for beams formed directly from an array of antenna elements as in the case shown by FIG. 8, in the acquisition process, a succession of beams is formed in a first time sequence at the first station using the first sub-set of the pre-determined plurality of antenna weight vectors to send first messages.

Dependent on the receipt of a first message at the second station using a first beam at the first station, and an acknowledgement from the second station that the first message has been received, the first beam is used as the basis of a finer refinement process. The acknowledgement from the second station may be carried in the first beam in the case that the first beam is used for both transmit and receive in a time division duplex arrangement. A refined search is carried out using a further succession of beams formed at the first station using a second sub-set of the pre-determined plurality of antenna weight vectors selected to form beams adjacent to the first beam. As shown in FIG. 17, the second sub-set is selected to form at least a ring of six beams surrounding the respective first and second beams if the first or second beam is not at an edge of the grid. The second sub-set of beams is shown in FIG. 17 by the beams marked by squares, 39a, 39b, etc., which surround the first beam 38 which was selected in the initial acquisition process. This provides an efficient process for selecting a best beam for use after establishing initial communication.

Figure 22:
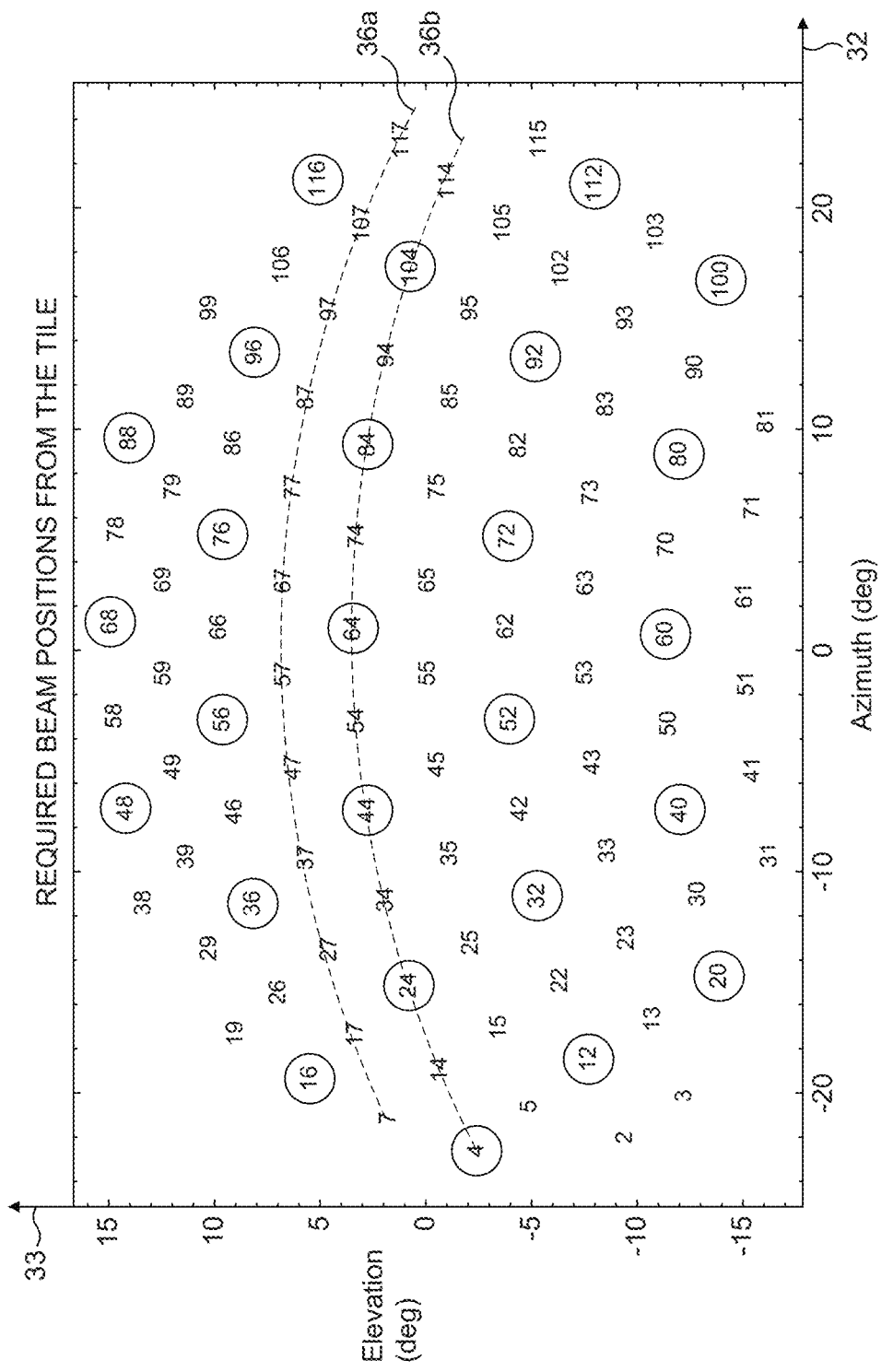
FIG. 22 shows a plurality of feed beams from the array of antenna elements as a feed to the secondary reflector of a Gregorian antenna system.

FIG. 22 shows the arrangement of the feed beams generated by the array of antenna elements to feed the secondary reflector, and to produce the arrangement of beams from the primary reflector dish shown in FIG. 20 and FIG. 21. Each feed beam number in FIG. 22 produces the correspondingly numbered beam from the primary reflector dish as shown in FIG. 20.

As can be seen, the relationship between the azimuth and elevation direction of each feed beam and the azimuth and elevation direction of the respective beam from the primary reflector dish is a non-linear function of azimuth and elevation. As shown in FIG. 22, the pre-determined plurality of antenna weight vectors is configured to form the plurality of feed beams such that the orientations of the plurality of beams is arranged in a distorted grid comprising a plurality of curved rows 36a, 36b, etc., each curved row providing a monotonic change in azimuth 32 angle along the curved row, and a non-monotonic change in elevation 33 angle along the curved row. As shown, each curved row 36a, 36b, etc., has an offset in elevation angle between the centre of the curved row and either end of the curved row. In this example, the offset in elevation angle for a curved row is equal to the angular spacing in elevation between the curved row and an adjacent curved row +/−50%. In this example, each curved row has a greater elevation angle at the centre of the curved row than at either end of the curved row, and in this example each curved row has an approximately parabolic dependence of elevation angle on azimuth angle, within +/−50% of a true parabola.

An example of an equation which may be used to relate the azimuth and elevation direction of each feed beam (x1, y1) to the azimuth and elevation direction of the respective beam from the primary reflector dish (x, y) is as follows:

$$x1 = x^2((0.12 - 0.0052y)y + 0.17) + 0.21x^3 + x((0.16y + 0.55)y - 13.) + y((-0.27y - 0.55)y - 0.27) - 0.38$$

$$y1 = x^2((0.061 - 0.047y)y - 1.7) + 0.077x^3 + x((0.030y + 0.00061)y - 0.46) + y((0.45y - 0.48)y - 14.) - 5.8$$

The above equation has been found to be a useful approximation.

Both the first and second wireless station may form a plurality of beams during the process of establishing communication. In this case, the second station has an antenna comprising an array of antenna elements and a beamforming network, the beamforming network being configured to form a beam using an antenna weight vector selected from a pre-determined plurality of antenna weight vectors. The method comprises providing a second pre-determined plurality of antenna weight vectors at the second station configured to form a second plurality of beams, the orientations of the second plurality of beams being arranged in a second grid comprising a plurality of rows, the beams of each row being spaced in angular position in the row by a second angular separation, the angular position of the beams of each row being offset by half of the second angular separation with respect to the angular positions of beams in an adjacent row. A sub-set of the second pre-determined plurality of antenna weight vectors are selected for use at the second station. A succession of beams are formed in a second time sequence at the second station using the sub-set of the second pre-determined plurality of antenna weight vectors. Dependent on the receipt of a first message at the second station using the first beam at the first station and a second beam at the second station, forming the further succession of beams at the first station using the second sub-set of the pre-determined plurality of antenna weight vectors selected to form beams adjacent to the first beam, and forming a further succession of beams at the second station using the second sub-set of the second pre-determined plurality of antenna weight vectors selected to form beams adjacent to the second beam.

FIG. 23 is a flow diagram of a method in an example, according to steps S23.1, S23.2, S23.3 and S23.4.

In an example, the wireless communication system may have an operating frequency of is a least 50 GHz. In other examples, the wireless communication system may have an operating frequency of greater than 28 GHz, for example 28 GHz.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

What is claimed is:

1. A subscriber module of a fixed wireless access communication system, the subscriber module comprising:
 an offset Gregorian antenna arrangement comprising a primary reflector dish and a secondary reflector;

an array of antenna elements arranged as a feed for the secondary reflector;
a beamforming network, the beamforming network being configured to form a beam using an antenna weight vector; and
a processor configured to provide the antenna weight vector selected from a pre-determined plurality of antenna weight vectors to the beamformer,
wherein the processor is configured to provide the pre-determined plurality of antenna weight vectors configured to form a plurality of beams, the orientations of the plurality of beams being arranged in a grid comprising a plurality of rows, each of the pre-determined plurality of antenna weight vectors being configured to form a respective beam from the primary reflector dish of the Gregorian antenna arrangement by forming a respective feed beam from the array of antenna elements,
wherein a relationship between the azimuth and elevation direction of each feed beam and the azimuth and elevation direction of the respective beam from the primary reflector dish is a non-linear function of azimuth and elevation.

2. The subscriber module of claim 1, wherein the pre-determined plurality of antenna weight vectors is configured to form the plurality of feed beams such that the orientations of the plurality of beams is arranged in a distorted grid comprising a plurality of curved rows, each curved row providing a monotonic change in azimuth angle along the curved row, and a non-monotonic change in elevation angle along the curved row.

3. The subscriber module of claim 2, wherein each curved row has an offset in elevation angle between the centre of the curved row and either end of the curved row.

4. The subscriber module of claim 3, wherein said offset in elevation angle for a curved row is equal to the angular spacing in elevation, at the centre of the curved row, between the curved row and an adjacent curved row+/−50%.

5. The subscriber module of claim 2, wherein each curved row has a greater elevation angle at the centre of the curved row than at either end of the curved row.

6. The subscriber module of claim 2, wherein each curved row has an approximately parabolic dependence of elevation angle on azimuth angle, within +/−50% of a true parabola.

7. The subscriber module of claim 1, wherein the array of antenna elements has 8 element columns and 8 element rows with a spacing between antenna elements in each element row and in each element column of substantially half a wavelength at an operating frequency of the wireless communication system.

8. The subscriber module of claim 1, wherein each pre-determined antenna weight vector provides a respective phase shift for each antenna element.

9. A method of forming a beam from a subscriber module of a fixed wireless access communication system, the subscriber module having an offset Gregorian antenna system comprising a primary reflector dish, a secondary reflector, an array of antenna elements and a beamforming network, the beamforming network being configured to form a beam using an antenna weight vector selected from a pre-determined plurality of antenna weight vectors, wherein the array of antenna elements is arranged to feed the secondary reflector to form the beam from the primary reflector dish, the method comprising:
providing the pre-determined plurality of antenna weight vectors configured to form a plurality of beams, the orientations of the plurality of beams being arranged in a grid comprising a plurality of rows, each of the pre-determined plurality of antenna weight vectors being configured to form a respective beam from the primary reflector dish of the Gregorian antenna arrangement by forming a respective feed beam from the array of antenna elements,
wherein a relationship between the azimuth and elevation direction of each feed beam and the azimuth and elevation direction of the respective beam from the primary reflector dish is a non-linear function of azimuth and elevation.

10. The method of claim 9, wherein the pre-determined plurality of antenna weight vectors is configured to form the plurality of feed beams such that the orientations of the plurality of beams is arranged in a distorted grid comprising a plurality of curved rows, each curved row providing a monotonic change in azimuth angle along the curved row, and a non-monotonic change in elevation angle along the curved row.

11. The method of claim 10, wherein each curved row has an offset in elevation angle between the centre of the curved row and either end of the curved row.

12. The method of claim 11, wherein said offset in elevation angle for a curved row is equal to the angular spacing in elevation, at the centre of the curved row, between the curved row and an adjacent curved row+/−50%.

13. The method of claim 10, wherein each curved row has a greater elevation angle at the centre of the curved row than at either end of the curved row.

14. The method of claim 10, wherein each curved row has an approximately parabolic dependence of elevation angle on azimuth angle, within +/−50% of a true parabola.

15. The method of claim 9, wherein the array of antenna elements has 8 element columns and 8 element rows with a spacing between antenna elements in each element row and in each element column of substantially half a wavelength at an operating frequency of the wireless communication system.

16. The method of claim 9, wherein each pre-determined antenna weight vector provides a respective phase shift for each antenna element.

* * * * *